US012675564B2

(12) United States Patent
Shen et al.

(10) Patent No.: US 12,675,564 B2
(45) Date of Patent: Jul. 7, 2026

(54) PROCESSING METHOD, DEVICE, AND STORAGE MEDIUM

(71) Applicant: SHENZHEN TRANSSION HOLDINGS CO., LTD., Shenzhen (CN)

(72) Inventors: Jianfeng Shen, Shenzhen (CN); Zhiyong Wang, Shenzhen (CN); Chenxiong Li, Shenzhen (CN)

(73) Assignee: SHENZHEN TRANSSION HOLDINGS CO., LTD., Shenzhen (CN)

( * ) Notice: Subject to any disclaimer, the term of this patent is extended or adjusted under 35 U.S.C. 154(b) by 200 days.

(21) Appl. No.: 18/522,865

(22) Filed: Nov. 29, 2023

(65) Prior Publication Data

US 2024/0095335 A1     Mar. 21, 2024

Related U.S. Application Data

(63) Continuation of application No. PCT/CN2021/118622, filed on Sep. 15, 2021.

(30) Foreign Application Priority Data

Jun. 1, 2021    (CN) .......................... 202110607128.4

(51) Int. Cl.
*H04L 12/28*        (2006.01)
*G06F 21/32*        (2013.01)
*G06F 21/44*        (2013.01)
(52) U.S. Cl.
CPC ........... *G06F 21/445* (2013.01); *G06F 21/32* (2013.01)

(58) Field of Classification Search
CPC ........ G06F 21/44; G06F 21/445; G06F 21/31; G06F 21/32

(Continued)

(56) References Cited

U.S. PATENT DOCUMENTS 6,202,096 B1 *  3/2001  Williams ................ H04L 69/28
                                                709/227
10,057,269 B1   8/2018  Ellingson
(Continued)

FOREIGN PATENT DOCUMENTS

CN        101114327 A     1/2008
CN        103019555 A     4/2013
(Continued)

OTHER PUBLICATIONS

Extended European Search Report issued in counterpart European Patent Application No. 21943791.0, dated Sep. 10, 2024.
(Continued)

*Primary Examiner* — Bharat Barot
(74) *Attorney, Agent, or Firm* — Westbridge IP LLC

(57) ABSTRACT

Disclosed are a processing method, a processing device and a readable storage medium. The method includes: in response to the first device performing a first operation, outputting at least one first processing information; receiving and processing second processing information to obtain at least one feedback result, the second processing information is obtained by the at least one second device performing corresponding processing based on the first processing information; and outputting the feedback result to the second device.

18 Claims, 7 Drawing Sheets

(58) Field of Classification Search
USPC ............................................. 726/4–6, 17–19
See application file for complete search history.

(56)                    References Cited

U.S. PATENT DOCUMENTS

| | | | | |
|---|---|---|---|---|
| 10,180,682 B2 * | 1/2019 | Rasmussen | ............. | H04L 63/10 |
| 10,771,244 B2 * | 9/2020 | Kim | ...................... | H04L 63/061 |
| 10,819,455 B2 * | 10/2020 | Wu | ......................... | G06F 9/542 |
| 11,736,466 B2 * | 8/2023 | Gibson | .............. | H04L 63/0853 |
| | | | | 726/9 |
| 2008/0183817 A1 | 7/2008 | Baek et al. | | |
| 2018/0239349 A1 | 8/2018 | Rasmussen et al. | | |
| 2018/0343260 A1 | 11/2018 | Ellingson | | |
| 2020/0292598 A1 | 9/2020 | Li et al. | | |
| 2022/0224985 A1 * | 7/2022 | Zhang | .................. | H04N 21/454 |
| 2024/0007851 A1 * | 1/2024 | Yan | ....................... | H04L 67/125 |

FOREIGN PATENT DOCUMENTS

| | | | |
|---|---|---|---|
| CN | 103246435 A | 8/2013 |
| CN | 104423844 A | 3/2015 |
| CN | 105843573 A | 8/2016 |
| CN | 108347369 A | 7/2018 |
| CN | 110703666 A | 1/2020 |
| CN | 111581938 A | 8/2020 |
| CN | 111901211 A | 11/2020 |
| CN | 112051958 A | 12/2020 |
| CN | 112463005 A | 3/2021 |
| CN | 113064536 A | 7/2021 |

OTHER PUBLICATIONS

First Office Action issued in counterpart Chinese Patent Application No. 202110607128.4, dated Jul. 16, 2021.
International Search Report and Written Opinion issued in corresponding PCT Application No. PCT/CN2021/118622, dated Feb. 25, 2022.
Lin et al., Research on projection-oriented hands and projection interactive technology and the application of the game, 2012 International Conference on Intelligent Systems Design and Engineering Application, 2012, pp. 489-492, dated Apr. 3, 2012.
Notification to Grant Patent Right for Invention issued in counterpart Chinese Patent Application No. 202110607128.4, dated Aug. 26, 2021.
Second Office Action issued in counterpart Chinese Patent Application No. 202110607128.4, dated Aug. 9, 2021.
Zhang et al., Control strategy of task scheduling permission in cyber-physical system, Computer Engineering, 2017, 43 (4), pp. 60-66, dated Apr. 30, 2017.
Office Action issued in counterpart Indian Patent Application No. 202327089798, dated Jul. 1, 2025.
Second Office Action issued in counterpart European Patent Application No. EP 21943791.0, dated Dec. 17, 2025.

* cited by examiner

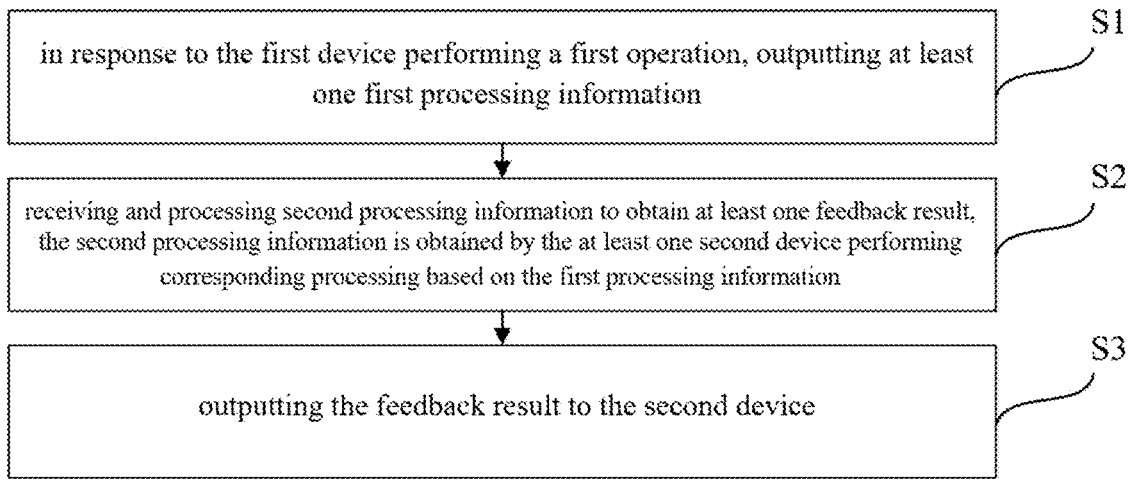

in response to the first device performing a first operation, outputting at least one first processing information — S1 receiving and processing second processing information to obtain at least one feedback result, the second processing information is obtained by the at least one second device performing corresponding processing based on the first processing information — S2 outputting the feedback result to the second device — S3

FIG. 3

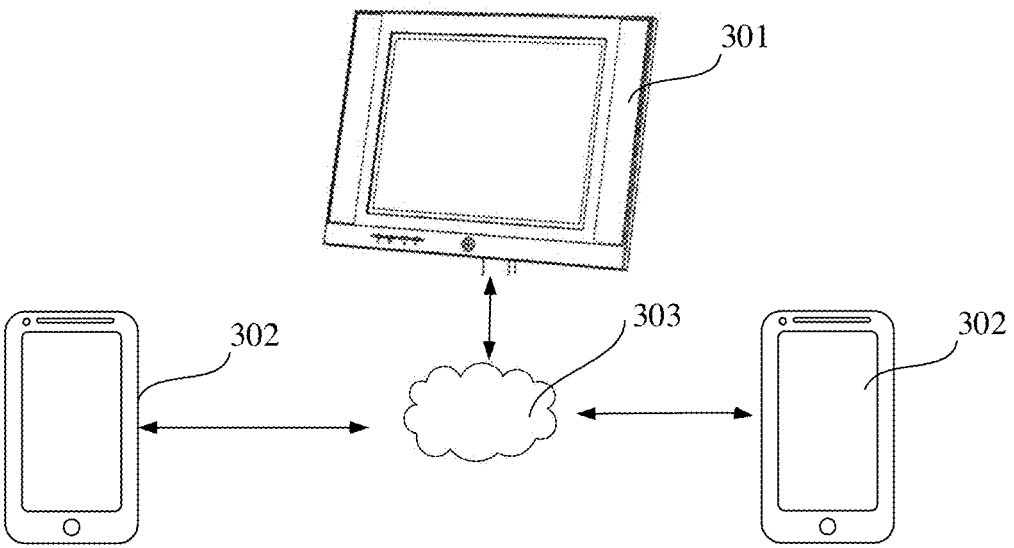

FIG. 4

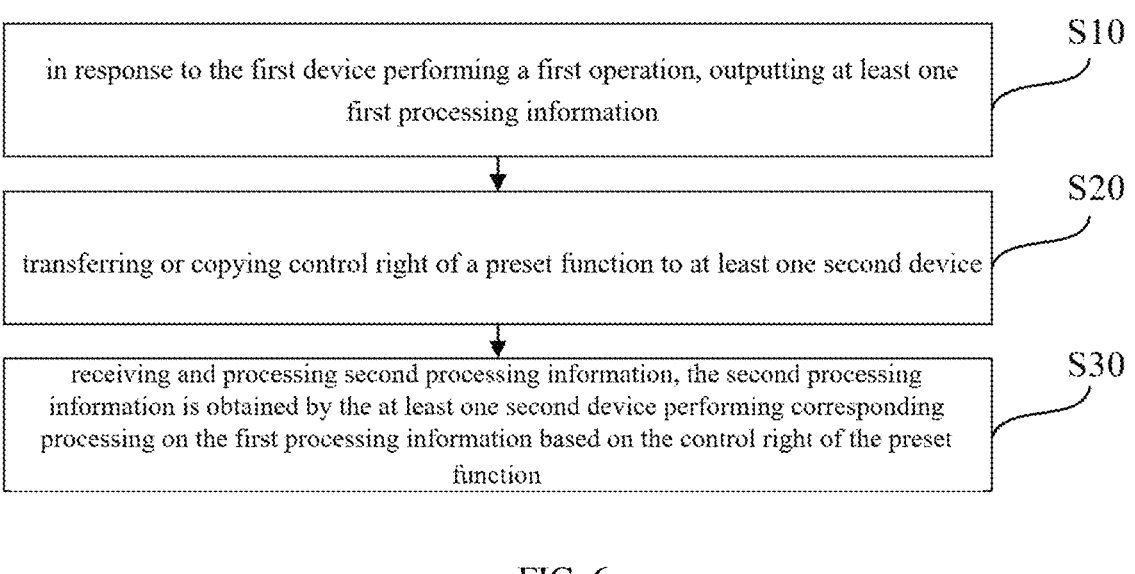

in response to the first device performing a first operation, outputting at least one first processing information

S10 transferring or copying control right of a preset function to at least one second device

S20 receiving and processing second processing information, the second processing information is obtained by the at least one second device performing corresponding processing on the first processing information based on the control right of the preset function

S30

FIG. 6 in response to the first device performing a first operation, transferring or copying the control right of the preset function to at least one second device

S100 receiving and processing a processing information sent by at least one second device, the processing information being obtained by at least one second device performing corresponding processing based on control right of the preset function

S200 outputting the feedback result to the second device

PROCESSING METHOD, DEVICE, AND STORAGE MEDIUM

CROSS-REFERENCE TO RELATED APPLICATIONS

This application is a continuation application of International Application No. PCT/CN2021/118622, filed on Sep. 15, 2021, which claims priority to Chinese Patent Application No. 202110607128.4, filed on Jun. 1, 2021. The disclosures of the above-mentioned applications are incorporated herein by reference in their entireties.

TECHNICAL FIELD

The present application relates to electronic technologies, and in particular, to a processing method, a processing device, and a readable storage medium.

BACKGROUND

With the popularization of wearable smart devices (such as smart watches, smart headphones, smart bracelets, smart glasses, etc.), smart teaching equipment (such as smart blackboards, smart TVs, smart speakers, etc.) and Internet of Vehicles (IoV) devices (such as smart cars, vehicle-mounted terminals, navigation devices, etc.), great convenience has been brought to people's life and study.

During the process of conceiving and implementing the present application, the inventor found that there are at least the following problems: when information exchange between devices is inconvenient. For example, information can generally only be processed and/or output on the device where the information is stored, there is a lack of linkage between various devices, resulting in a poor user experience.

The foregoing description is provided to provide general background information and does not necessarily constitute prior art.

SUMMARY

During the process of conceiving and implementing the present application, the inventor found that there are at least the following problems: when information exchange between devices is inconvenient. For example, information can generally only be processed and/or output on the device where the information is stored, there is a lack of linkage between various devices, resulting in a poor user experience.

In view of the above technical problems, the present application provides a processing method, a processing equipment and a readable storage medium, which can realize information interaction between devices conveniently, and improve the user experience through linkage between devices.

In order to solve the above technical problems, the present application provides a processing method, which is applied to the first device. The processing method includes the steps:

S1: in response to the first device performing a first operation, outputting at least one first processing information;

S2: receiving and processing second processing information to obtain at least one feedback result, the second processing information is obtained by the at least one second device performing corresponding processing based on the first processing information; and S3: outputting the feedback result to the second device.

In an embodiment, in step S1, the first operation includes at least one of the following:

confirming at least one first data information;

accessing default applications and/or services;

operating preset function buttons, such as homework assignment buttons, in-class inspection buttons, screen sharing buttons, game function buttons, etc.

In an embodiment, in the step S1, the first processing information includes at least one of the following:

document information or text information;

image information;

audio information or video information;

related information of at least one first user corresponding to the first device (such as image information, in an embodiment, real time image information and non-real time image information may be adopted).

In an embodiment, before the step S2, the method includes:

transferring or copying the control right of the preset function to at least one of the second devices.

The step of transferring or copying the control right of the preset function to at least one of the second devices includes:

in response to the first device performing the first operation, determining at least one preset function to be transferred or copied based on key information.

In an embodiment, the step of transferring or copying the control right of the preset function to at least one of the second devices includes:

in response to the first device meeting a first control condition, and/or the preset function meeting a second control condition, and/or the second device meeting the requirements, transferring or copying the control right of the preset function to at least one of the second devices.

In an embodiment, the step of transferring or copying the control right of the preset function to at least one of the second devices includes:

detecting whether the first device meeting the first control condition and/or whether the preset function meeting the second control condition;

in response to the first device meeting the first control condition, detecting whether there is a second device meeting the requirements among devices connected to the first device;

in response to the preset function meeting the second control condition, transferring or copying the control right of the preset function to at least one of the second devices; and/or, in response to the first device not meeting the first control condition and/or whether the preset function not meeting the second control condition, skipping transferring or copying the control right of the preset function to at least one of the second devices and/or outputting prompt information.

In an embodiment, the first control condition includes at least one of the following:

accessing one preset application and/or service;

not accessing one certain preset application and/or service;

detecting preset identity information; configuration value corresponding to the preset function being less than or equal to a threshold.

The second control condition includes at least one of the following:

the authority level being less than or equal to the preset level;

matching an application and/or service running on the first device;

matching the first processing information;

matching the preset identity information.

In an embodiment, the key information includes at least one of the following:

function information of the first device;

function requirement information of the first device;

identity information; and right information.

In an embodiment, before the step S2, the method includes:

determining at least one second device according to the first operation and/or the first processing information.

In an embodiment, in the step S2, the second processing information being obtained by the at least one second device performing corresponding processing based on the first processing information includes at least one of the following:

the second device outputting the first processing information, receiving a second operation, and performing corresponding processing on the first processing information according to the second operation;

the second device receiving the first processing information and performing corresponding processing on the first processing information according to a first preset processing rule;

the second device performing corresponding processing on the first processing information based on a control right of the preset function transferred or copied by the first device.

In an embodiment, after the second device receiving the first processing information and performing corresponding processing on the first processing information according to the first preset processing rule, the method includes:

the second device outputting the first processing information processed according to the first preset processing rule; and after receiving the third operation, the second device outputting the second processing information.

In an embodiment, the second operation and/or the third operation include at least one of the following:

editing operations or adding operations or deleting operations;

selecting operation;

sharing operation or sending operation or receiving operation or transmitting operation; and confirming operation.

In an embodiment, the first preset processing rule includes at least one of the following:

outputting the received first processing information;

processing and outputting the received first processing information;

opening or starting or resuming a preset application and/or service; and triggering a preset function.

In an embodiment, the processing the received first processing information may include at least one of the following:

filtering processing, for example, filtering the first processing information according to the location of the second device and/or the attributes of the second user (such as age, gender, class, etc.) corresponding to the second device;

adjusting processing, for example, editing the first processing information according to the attributes of the second user corresponding to the second device, such as adjusting the format, font size, order, etc. of the document information;

delaying processing and/or transmitting processing, for example, displaying and/or sending within a preset time period according to the status of at least one second user corresponding to the second device (such as location, leave status, etc.) and/or pre-stored settings. Opening or starting or restoring a certain preset application and/or service according to the attributes of the first processing information and/or triggering a certain preset function to output the first processing information, etc.

In an embodiment, the step S2 includes at least one of the following:

outputting the second processing information, receiving the fourth operation, and performing corresponding processing on the second processing information according to the fourth operation;

receiving the second processing information, performing corresponding processing on the second processing information according to the second preset processing rule.

In an embodiment, the step S2 includes:

outputting the second processing information, receiving the fourth operation, and performing corresponding processing on the second processing information according to the fourth operation;

processing the processed second processing information after corresponding processing according to the second preset processing rule to obtain feedback results.

In an embodiment, in the step S3, the feedback result includes at least one of the following:

information after updating (such as editing, adding or deleting, etc.) the second processing information;

information being started or paused or resumed or suspended or terminated to transmit; and information being received or unreceived.

In an embodiment, in the step S1, the outputting at least one first processing information includes at least one of the following:

outputting the first processing information in the first device according to a first preset strategy;

outputting the first processing information according to a second preset strategy.

In an embodiment, the first preset strategy includes at least one of the following:

in response to that the first processing information is at least one of the document information, text information, picture information, and at least one first user information corresponding to the first device, the first device displays the first processing information; and in response to that the first processing information is at least one of audio information, video information, and animation information, the first device plays the first processing information.

In an embodiment, the second preset strategy includes:

detecting whether the first device and/or the second device meet a first preset condition;

in response to the first device and/or the second device meeting a first preset condition, sending the first processing information directly; and/or, in response to the first device and/or the second device not meeting a first preset condition, performing corresponding processing on the first processing information, and then sending the processed first processing information.

In an embodiment, the first preset condition includes at least one of the following:

the first device and/or the second device being provided with a preset function or a preset service;

device parameters of the first device and/or the second device being greater than or equal to a device parameter threshold;

the first device and the second device being established a connection or being in a same communication network;

the first device and the second device being authenticated, or the first device and the second device being mutually authenticated; and the second device sending a processing information request to the first device, and the first device confirming sending the processing information.

In an embodiment, the corresponding processing of the first processing information includes at least one of the following:

compression, format conversion, encryption.

The present application further provides a second processing method applied to the second device, the processing method includes the steps:

receiving the at least one processing information output by the first device in response to performing the first operation;

outputting the second processing information obtained by performing corresponding processing based on the first processing information;

receiving the feedback result output by the first device, the feedback result is obtained by the at least one first device performing corresponding processing based on the second processing information.

In an embodiment, the step of outputting the second processing information obtained by performing corresponding processing based on the first processing information includes at least one of the following:

outputting the first processing information, receiving a second operation, and performing corresponding processing on the first processing information according to the second operation;

receiving the first processing information and performing corresponding processing on the first processing information according to a first preset processing rule;

performing corresponding processing on the first processing information based on a control right of the preset function transferred or copied by the first device.

In an embodiment, after the step of receiving the first processing information and performing corresponding processing on the first processing information according to a first preset processing rule, the method includes:

outputting the first processing information processed according to the first preset processing rule;

after receiving the third operation, the second device outputting the second processing information.

In an embodiment, the second operation and/or the third operation includes at least one of the following:

editing operations or adding operations or deleting operations;

selecting operation;

sharing operation or sending operation or receiving operation or transmitting operation; and confirming operation.

In an embodiment, the first preset processing rule includes at least one of the following:

outputting the received first processing information;

processing and outputting the received first processing information;

opening or starting or resuming a preset application and/or service; and triggering a preset function.

In an embodiment, in the step of receiving the feedback result output by the first device, the feedback result is obtained by the at least one first device performing corresponding processing based on the second processing information, the feedback result includes at least one of the following:

information after updating (such as editing, adding or deleting, etc.) the second processing information;

information being started or paused or resumed or suspended or terminated to transmit; and information being received or unreceived.

The present application further provides a third processing method applied to the third device, the processing method includes the steps:

S10: in response to the first device performing a first operation, outputting at least one first processing information;

S20: transferring or copying a control right of a preset function to at least one second device; and S30: receiving and processing second processing information, the second processing information is obtained by the at least one second device performing corresponding processing on the first processing information based on the control right of the preset function.

In an embodiment, before the step S20, the method includes:

determining at least one second device according to the first operation and/or the first processing information.

In an embodiment, the step S20 includes:

detecting whether the first device meeting the first control condition and/or whether the preset function meeting the second control condition;

in response to the first device meeting the first control condition, detecting whether there is a second device meeting the requirements among devices connected to the first device;

in response to the preset function meeting the second control condition, transferring or copying the control right of the preset function to at least one of the second devices.

In an embodiment, the second device meeting the requirements includes at least one of the following:

the power being greater than or equal to a threshold;

the authority level being greater than or equal to a preset level;

outputting the confirmation information;

being provided with the configuration corresponding to the preset function; and the environment information meeting a preset environment condition.

In an embodiment, the second processing information being obtained by the at least one second device performing corresponding processing based on the first processing information includes at least one of the following:

the second device outputting the first processing information, receiving a second operation, and performing corresponding processing on the first processing information according to the second operation;

the second device receiving the first processing information and performing corresponding processing on the first processing information according to a first preset processing rule.

In an embodiment, after the step of the second device receiving the first processing information and performing corresponding processing on the first processing information according to a first preset processing rule, the method includes:

the second device outputting the first processing information processed according to the first preset processing rule; and after receiving the third operation, the second device outputting the second processing information.

In an embodiment, in the step S10, the outputting the at least one first processing information includes at least one of the following:

outputting the first processing information in the first device according to a first preset strategy; and sending the first processing information according to the second preset strategy.

In am embodiment, the first preset strategy includes at least one of the following:

in response to that the first processing information is at least one of the document information, text information, picture information, the related information of at least one first user corresponding to the first device, then the first device displays the first processing information;

in response to that the first processing information is at least one of audio information, video information, and animation information, the first device plays the first processing information.

In an embodiment, the second preset strategy includes:

detecting whether the first device and/or the second device meet a first preset condition;

in response to the first device and/or the second device meeting the first preset condition, sending the first processing information directly; and/or, in response to the first device and/or the second device not meeting the first preset condition, performing corresponding processing on the first processing information, and then sending the processed first processing information.

In an embodiment, the first preset condition includes at least one of the following:

the first device and/or the second device being provided with a preset function or a preset service;

device parameters of the first device and/or the second device being greater than or equal to a device parameter threshold;

the first device and the second device being established a connection or being in a same communication network;

the first device and the second device being authenticated, or the first device and the second device being mutually authenticated; and the second device sending a processing information request to the first device, and the first device confirming sending the processing information.

In an embodiment, the corresponding processing of the first processing information includes at least one of the following:

compression, format conversion, and encryption.

The present application further provides a fourth processing method applied to the first device, the processing method includes the steps:

S100: in response to the first device performing a first operation, transferring or copying the control right of the preset function to at least one second device; and S200: receiving and processing a processing information sent by at least one second device, the processing information being obtained by at least one second device performing corresponding processing based on control right of the preset function.

In an embodiment, the step S100 includes:

in response to the first device performing a first operation, detecting whether the first device meeting the first control condition and/or whether the preset function meeting the second control condition;

in response to the first device meeting the first control condition, detecting whether there is a second device meeting the requirements among devices connected to the first device;

in response to the preset function meeting the second control condition, transferring or copying the control right of the preset function to at least one of the second devices.

In an embodiment, the step of copying or transferring the control right of the preset function to at least one of the second devices includes:

in response to the first device performing the first operation, determining at least one preset function to be transferred or copied based on key information.

In an embodiment, the step of transferring or copying the control right of the preset function to at least one of the second devices includes:

in response to the first device performing the first operation, determining at least one preset function to be transferred or copied based on key information.

In an embodiment, the key information includes at least one of the following:

device function requirement information;

identity information; and right information.

In an embodiment, the step of the processing information is obtained by the at least one second device performing corresponding processing based on the control right of the preset function includes at least one of the following:

the second device outputting the first processing information, receiving a second operation, and performing corresponding processing on the first processing information according to the second operation, the first processing information is output by the first device in response to the first operation.

the second device receiving the first processing information and performing corresponding processing on the first processing information according to a first preset processing rule.

In an embodiment, after the step of the second device receiving the first processing information and performing corresponding processing on the first processing information according to a first preset processing rule, the method includes:

the second device outputting the first processing information processed according to the first preset processing rule; and after receiving the third operation based on the control right of the preset function, the second device outputting the processing information.

In an embodiment, the second operation and/or the third operation includes at least one of the following:

editing operations or adding operations or deleting operations;

selecting operation;

sharing operation or sending operation or receiving operation or transmitting operation; and confirming operation.

In an embodiment, the first preset processing rule includes at least one of the following:

outputting the received first processing information;

processing and outputting the received first processing information;

opening or starting or resuming a preset application and/or service; and triggering a preset function.

In an embodiment, performing the processing includes at least one of the following:

filtering processing, for example, filtering the first processing information according to the location of the second device and/or the attributes of the second user (such as age, gender, class, etc.) corresponding to the second device;

adjusting processing, for example, editing the first processing information according to the attributes of the second user corresponding to the second device, such as adjusting the format, font size, order, etc. of the document information;

delaying processing and/or transmitting processing, for example, displaying and/or sending within a preset time period according to the status of at least one second user corresponding to the second device (such as location, leave status, etc.) and/or pre-stored settings. Opening or starting or restoring a certain preset application and/or service according to the attributes of the first processing information and/or triggering a certain preset function to output the first processing information, etc.

In an embodiment, the processing method further includes:

S300: outputting the feedback result to the second device.

In an embodiment, in the step S300, the feedback result includes at least one of the following:

information after updating (such as editing, adding or deleting, etc.) the second processing information;

information being started or paused or resumed or suspended or terminated to transmit; and information being received or unreceived.

As described above, the processing method, processing device and readable storage medium of the present application includes the following steps. In response to the first device performing a first operation, outputting at least one first processing information, receiving and processing second processing information to obtain at least one feedback result, the second processing information is obtained by the at least one second device performing corresponding processing based on the first processing information; and outputting the feedback result to the second device. Based on the operations performed by the first device, the present application conveniently realizes information interaction with at least one second device, and improves the user experience through linkage between devices.

BRIEF DESCRIPTION OF THE DRAWINGS

The accompanying drawings, which are incorporated in and constitute a part of this specification, illustrate embodiments consistent with the application and together with the description serve to explain the principles of the application. In order to more clearly illustrate the technical solutions of the embodiments of the present application, the following will briefly introduce the drawings that need to be used in the description of the embodiments. Apparently, those skilled in the art can also obtain other drawings based on these drawings without any creative effort.

FIG. 3 is a schematic flowchart of the processing method according to a first embodiment.

FIG. 4 is a schematic diagram of scenarios and/or modes of the processing method according to the first embodiment.

FIG. 6 is a schematic flowchart of the processing method according to a second embodiment.

FIG. 7 is a schematic flowchart of the processing method according to a third embodiment.

Figure 1:
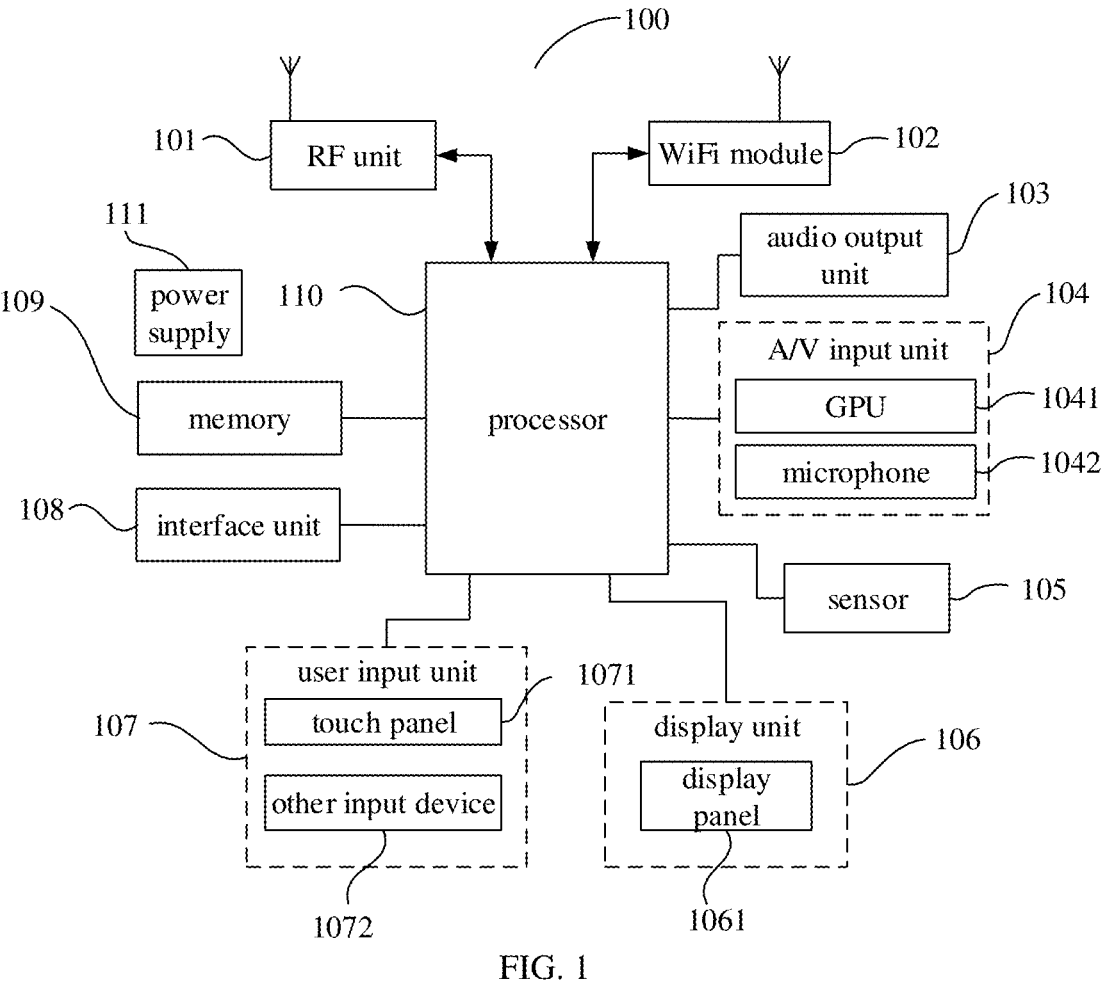
FIG. 1 is a schematic diagram of the hardware structure of a mobile terminal that implements various embodiments of the present application.

The realization, functional features and advantages of the present application will be further described in conjunction with the embodiments and with reference to the accompanying drawings. By means of the above drawings, specific embodiments of the present application have been shown, which will be described in more detail hereinafter. These drawings and text descriptions are not intended to limit the scope of the concept of the application in any way, but to illustrate the concept of the application for those skilled in the art by referring to specific embodiments.

DETAILED DESCRIPTION OF THE EMBODIMENTS

Reference will now be made in detail to the exemplary embodiments, examples of which are illustrated in the accompanying drawings. When the following description refers to the accompanying drawings, the same numerals in different drawings refer to the same or similar elements unless otherwise indicated. The implementations described in the following exemplary embodiments do not represent all implementations consistent with the present application. Rather, they are merely examples of devices and methods consistent with aspects of the present application as recited in the appended claims.

It should be noted that in this document, the terms "comprise", "include" or any other variants thereof are intended to cover a non-exclusive inclusion. Thus, a process, method, article, or system that includes a series of elements not only includes those elements, but also includes other elements that are not explicitly listed, or also includes elements inherent to the process, method, article, or system. If there are no more restrictions, the element defined by the sentence "including a . . . " does not exclude the existence of other identical elements in the process, method, article or system that includes the element. In addition, components, features, and elements with the same name in different embodiments of the present application may have the same or different meanings. Its specific meaning needs to be determined according to its explanation in the specific embodiment or further combined with the context in the specific embodiment.

It should be understood that although the terms first, second, third, etc. may be used herein to describe various information, the information should not be limited to these terms. These terms are only used to distinguish information of the same type from one another. For example, without departing from the scope of this document, first information may also be called second information, and similarly, second information may also be called first information. Depending on the context, the word "if" as used herein may be interpreted as "at" or "when" or "in response to a determination". Furthermore, as used herein, the singular forms "a", "an" and "the" are intended to include the plural forms as well, unless the context indicates otherwise. It should be further understood that the terms "comprising", "including" indicate the existence of features, steps, operations, elements, components, items, species, and/or groups, but does not exclude the existence, occurrence or addition of one or more other features, steps, operations, elements, components, items, species, and/or groups. The terms "or", "and/or", "comprising at least one of" and the like used in the present application may be interpreted as inclusive, or mean any one or any combination. For example, "comprising at least one of: A, B, C" means "any of: A; B; C; A and B; A and C; B and C; A and B and C". As another example, "A, B, or C" or "A, B, and/or C" means "any of the following: A; B; C; A and B; A and C; B and C; A and B and C". Exceptions to this definition will only arise when combinations of elements, functions, steps or operations are inherently mutually exclusive in some way.

It should be understood that although the various steps in the flowchart in the embodiment of the present application are displayed sequentially as indicated by the arrows, these steps are not necessarily executed sequentially in the order indicated by the arrows. Unless otherwise specified herein, there is no strict order restriction on the execution of these steps, and they can be executed in other orders. Moreover, at least some of the steps in the figure may include multiple sub-steps or multiple stages, these sub-steps or stages are not necessarily executed at the same time, but can be executed at different times. The execution sequence thereof is not necessarily performed sequentially, but may be performed alternately or alternately with at least a part of other steps or sub-steps or stages of other steps.

Depending on the context, the words "if" as used herein may be interpreted as "at" or "when" or "in response to determining" or "in response to detecting". Similarly, depending on the context, the phrases "if determined" or "if detected (the stated condition or event)" could be interpreted as "when determined" or "in response to the determination" or "when detected (the stated condition or event)" or "in response to detection (the stated condition or event)".

It should be noted that in this article, step codes such as S401 and S402 are used for the purpose of expressing the corresponding content more clearly and concisely, and do not constitute a substantive limitation on the order. Those skilled in the art may perform S402 first and then S401 etc. during specific implementation, but these should all be within the protection scope of the present application.

It should be understood that the specific embodiments described here are only used to explain the present application, and are not intended to limit the present application.

In the following description, the use of suffixes such as "module", "part" or "unit" for denoting elements is only for facilitating the description of the present application and has no specific meaning by itself. Therefore, "module", "part" or "unit" may be used in combination.

The mobile terminal can be implemented in various forms. For example, the mobile terminal described in the present application can include a mobile phone, a tablet computer, a notepad computer, a hand-held computer, a personal digital assistants (PDA), a portable media player (PMP), a navigation device, a wearable device, a smart bracelet, a pedometer and other mobile terminals, as well as a fixed terminal such as a digital TV and a desktop computer.

The present application takes a mobile terminal as an example to illustrate. Those skilled in the art will understand that, in addition to elements specifically used for mobile purposes, the configuration according to the embodiments of the present application can also be applied to the fixed terminal.

As shown in FIG. 1, FIG. 1 is a schematic structural diagram of a hardware of a mobile terminal according to embodiments of the present application. The mobile terminal 100 can include a Radio Frequency (RF) unit 101, a WiFi module 102, an audio output unit 103, an audio/video (A/V) input unit 104, a sensor 105, a display unit 106, a user input unit 107, an interface unit 108, a memory 109, a processor 110, a power supply 111 and other components. Those skilled in the art can understand that the structure of the mobile terminal shown in FIG. 1 does not constitute a limitation on the mobile terminal. The mobile terminal can include more or fewer components, or a combination of some components, or differently arranged components than shown in the figure.

Hereinafter, each component of the mobile terminal will be specifically introduced with reference to FIG. 1.

The radio frequency unit 101 can be used for transmitting and receiving signals during the process of transceiving information or talking. Specifically, after receiving the downlink information of the base station, the downlink information is processed by the processor 110; in addition, the uplink data is sent to the base station. Generally, the radio frequency unit 101 includes, but is not limited to, an antenna, at least one amplifier, a transceiver, a coupler, a low noise amplifier, a duplexer, and the like. In addition, the radio frequency unit 101 can also communicate with the network and other devices through wireless communication. The above-mentioned wireless communication can use any communication standard or protocol, including but not limited to Global System of Mobile communication (GSM), General Packet Radio Service (GPRS), Code Division Multiple Access 2000 (CDMA2000), Wideband Code Division Multiple Access (WCDMA), Time Division-Synchronous Code Division Multiple Access (TD-SCDMA), Frequency Division Duplexing-Long Term Evolution (FDD-LTE), Time Division Duplexing-Long Term Evolution (TDD-LTE), or the like.

Wi-Fi is a short-range wireless transmission technology. The mobile terminal can help users transmit and receive email, browse webpage, and access streaming media through the Wi-Fi module 102, and Wi-Fi provides users with wireless broadband Internet access. Although FIG. 1 shows the Wi-Fi module 102, it is understandable that it is not a necessary component of the mobile terminal and can be omitted as needed without changing the essence of the present application.

When the mobile terminal 100 is in a call signal receiving mode, a call mode, a recording mode, a voice recognition mode, a broadcast receiving mode, or the like, the audio output unit 103 can convert the audio data received by the radio frequency unit 101 or the Wi-Fi module 102 or stored in the memory 109 into an audio signal and output the audio signal as sound. Moreover, the audio output unit 103 can also provide audio output related to a specific function performed by the mobile terminal 100 (for example, call signal reception sound, message reception sound, or the like). The audio output unit 103 can include a speaker, a buzzer, or the like.

The A/V input unit 104 is configured to receive audio or video signals. The A/V input unit 104 can include a graphics processing unit (GPU) 1041 and a microphone 1042. The graphics processing unit 1041 processes image data of still pictures or videos obtained by an image capture device (such as a camera) in a video capture mode or an image capture mode. The processed image frame can be displayed on the display unit 106. The image frame processed by the graphics processing unit 1041 can be stored in the memory 109 (or other storage medium) or sent via the radio frequency unit 101 or the Wi-Fi module 102. The microphone 1042 can receive sound (audio data) in operation modes such as a call mode, a recording mode, a voice recognition mode, and the like, and can process such sound into audio data. The processed audio (voice) data can be converted into a format that can be sent to a mobile communication base station via the radio frequency unit 101 in the case of a call mode for output. The microphone 1042 can implement various types of noise cancellation (or suppression) algorithms to eliminate (or suppress) noise or interference generated during the process of transceiving audio signals.

The mobile terminal 100 also includes at least one sensor 105, such as a light sensor, a motion sensor, and other sensors. Specifically, the light sensor includes an ambient light sensor and a proximity sensor. The ambient light sensor can adjust the brightness of the display panel 1061 according to the brightness of the ambient light. The proximity sensor can turn off the display panel 1061 and/or the backlight when the mobile terminal 100 is moved to the ear. A gravity acceleration sensor, as a kind of motion sensor, can detect the magnitude of acceleration in various directions (usually three axes). The gravity acceleration sensor can detect the magnitude and direction of gravity when it is stationary, and can identify the gesture of the mobile terminal (such as horizontal and vertical screen switching, related games, magnetometer attitude calibration), vibration recognition related functions (such as pedometer, light press), or the like. The mobile terminal can also be equipped with other sensors such as a fingerprint sensor, a pressure sensor, an iris sensor, a molecular sensor, a gyroscope, a barometer, a hygrometer, a thermometer, an infrared sensor and other sensors, which will not be repeated here.

The display unit 106 is configured to display information input by the user or information provided to the user. The display unit 106 can include a display panel 1061, and the display panel 1061 can be configured in the form of a liquid crystal display (LCD), an organic light emitting diode (OLED), or the like.

The user input unit 107 can be configured to receive inputted numeric or character information, and generate key signal input related to user settings and function control of the mobile terminal. Specifically, the user input unit 107 can include a touch panel 1071 and other input devices 1072. The touch panel 1071, also called a touch screen, can collect user touch operations on or near it (for example, the user uses fingers, stylus and other suitable objects or accessories to operate on the touch panel 1071 or near the touch panel 1071), and drive the corresponding connection device according to a preset program. The touch panel 1071 can include two parts: a touch detection device and a touch controller. The touch detection device detects the user's touch position, detects the signal brought by the touch operation, and transmits the signal to the touch controller. The touch controller receives the touch information from the touch detection device, converts the touch information into contact coordinates, and sends it to the processor 110, and can receive and execute the instructions sent by the processor 110. In addition, the touch panel 1071 can be implemented in multiple types such as resistive, capacitive, infrared, and surface acoustic wave. In addition to the touch panel

1071, the user input unit 107 can also include other input devices 1072. Specifically, the other input devices 1072 can include, but are not limited to, one or more of physical keyboard, function keys (such as volume control buttons, switch buttons, etc.), trackball, mouse, joystick, etc., which are not specifically limited here.

Further, the touch panel 1071 can cover the display panel 1061. After the touch panel 1071 detects a touch operation on or near it, the touch operation is transmitted to the processor 110 to determine the type of the touch event, and then the processor 110 provides a corresponding visual output on the display panel 1061 according to the type of the touch event. Although in FIG. 1, the touch panel 1071 and the display panel 1061 are used as two independent components to realize the input and output functions of the mobile terminal, in some embodiments, the touch panel 1071 and the display panel 1061 can be integrated to implement the input and output functions of the mobile terminal, which is not specifically limited here.

The interface unit 108 serves as an interface through which at least one external device can be connected to the mobile terminal 100. For example, the external device can include a wired or wireless earphone port, an external power source (or battery charger) port, a wired or wireless data port, a memory card port, a port for connecting devices with identification modules, an audio input/output (I/O) port, a video I/O port, an earphone port, or the like. The interface unit 108 can be configured to receive input (such as data information, electricity, or the like) from an external device and transmit the received input to one or more elements in the mobile terminal 100 or can be configured to transfer data between the mobile terminal 100 and the external device.

The memory 109 can be configured to store software programs and various data. The memory 109 can mainly include a program storage area and a data storage area. The program storage area can store the operating system, at least one application required by the function (such as sound play function, image play function, etc.), or the like. The data storage area can store data (such as audio data, phone book, etc.) created based on the use of the mobile phone. In addition, the memory 109 can include a high-speed random access memory, and can also include a non-volatile memory, such as at least one magnetic disk storage device, a flash memory device, or other volatile solid-state storage devices.

The processor 110 is a control center of the mobile terminal, and uses various interfaces and lines to connect the various parts of the entire mobile terminal. By running or performing the software programs and/or modules stored in the memory 109, and calling the data stored in the memory 109, various functions and processing data of the mobile terminal are executed, thereby overall monitoring of the mobile terminal is performed. The processor 110 can include one or more processing units; and the processor 110 may integrate an application processor and a modem processor. The application processor mainly processes an operating system, a user interface, an application, or the like, and the modem processor mainly processes wireless communication. It can be understood that the foregoing modem processor may not be integrated into the processor 110.

The mobile terminal 100 can also include a power source 111 (such as a battery) for supplying power to various components. The power supply 111 can be logically connected to the processor 110 through a power management system, so that functions such as charging, discharging, and power consumption management can be managed through the power management system.

Although not shown in FIG. 1, the mobile terminal 100 can also include a Bluetooth module, or the like, which will not be repeated herein.

In order to facilitate the understanding of the embodiments of the present application, the following describes the communication network system on which the mobile terminal of the present application is based.

Figure 2:
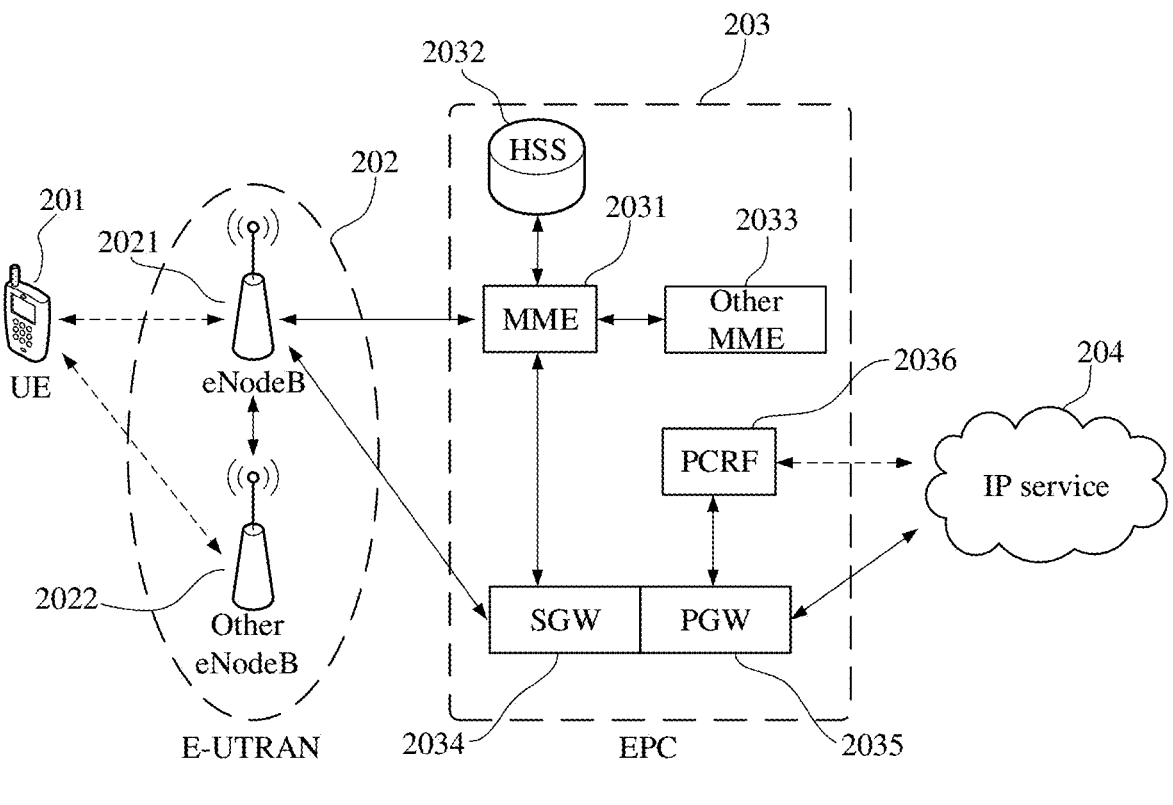
FIG. 2 is a system architecture diagram of a communication network according to an embodiment of the present application.

As shown in FIG. 2, FIG. 2 is an architecture diagram of a communication network system according to an embodiment of the present application. The communication network system is an LTE system of general mobile communication network technology. The LTE system includes a User Equipment (UE) 201, an Evolved UMTS Terrestrial Radio Access Network (E-UTRAN) 202, an Evolved Packet Core (EPC) 203, and an operator's IP service 204 that are sequentially connected in communication.

Specifically, the UE 201 can be the aforementioned terminal 100, which will not be repeated here.

E-UTRAN 202 includes eNodeB 2021 and other eNodeBs 2022. The eNodeB 2021 can be connected to other eNodeBs 2022 through a backhaul (for example, an X2 interface), the eNodeB 2021 is connected to the EPC 203, and the eNodeB 2021 can provide access from the UE 201 to the EPC 203.

The EPC 203 can include Mobility Management Entity (MIME) 2031, Home Subscriber Server (HSS) 2032, other MMES 2033, Serving Gate Way (SGW) 2034, PDN Gate Way (PGW) 2035, Policy and Charging Rules Function (PCRF) 2036, and so on. MME 2031 is a control node that processes signaling between UE 201 and EPC 203, and provides bearer and connection management. HSS 2032 is configured to provide some registers to manage functions such as the home location register (not shown), and save some user-specific information about service feature, data rates, and so on. All user data can be sent through SGW 2034, PGW 2035 can provide UE 201 IP address allocation and other functions. PCRF 2036 is a policy and charging control policy decision point for service data flows and IP bearer resources, which selects and provides available policy and charging control decisions for policy and charging execution functional units (not shown).

The IP service 204 can include Internet, intranet, IP Multimedia Subsystem (IMS), or other IP services.

Although the LTE system is described above as an example, those skilled in the art should know that, the present application is not only applicable to the LTE system, but also applicable to other wireless communication systems, such as GSM, CDMA2000, WCDMA, TD-SCDMA, and new network systems in the future, or the like, which is not limited herein.

Based on the above mobile terminal hardware structure and communication network system, various embodiments of the present application are proposed.

First Embodiment

FIG. 3 is a schematic flowchart of the processing method according to a first embodiment. As shown in FIG. 3, the processing method of the embodiment is applied to the first device, and the processing method includes the steps:

S1: in response to the first device performing a first operation, outputting at least one first processing information;

S2: receiving and processing second processing information to obtain at least one feedback result, the second processing information is obtained by the at least one second device performing corresponding processing based on the first processing information; and S3: outputting the feedback result to the second device.

The first device and the second device can be terminal devices (such as mobile phones, Portable Android Device (PAD) (tablet computers, etc.), wearable smart devices (such as smart watches, smart bracelets, smart headphones, etc.), smart teaching equipment (such as smart blackboards), smart TVs, smart speakers, etc.), Internet of Vehicles devices (such as smart cars, vehicle-mounted terminals, etc.). Through the above method, after performing the specified operation, the device can interact with at least one second device and output at least one first processing information, and after receiving the second processing information, output the feedback result to the second device. In an embodiment, the second processing information is obtained after at least one second device performs corresponding processing based on the first processing information, realizing the information interaction between devices, the whole process not only integrates the processing functions between devices, but is also convenient, and can achieve deeper linkage and interaction between devices, thereby greatly improving the user experience. For example, the first device multi-screen linkage teaching scenario and/or mode, in response to the first device performing a first operation, such as an operation of distributing a preset voice of the test paper, outputting at least one first processing information, such as test paper document information or text information, receiving and processing the second processing information. For example, the answer sheet information is used to obtain at least one feedback result, such as scoring information for the answer sheet information, and the feedback result is output to a second device, such as a student's tablet. In an embodiment, the second processing information is obtained after performed corresponding processing by at least one second device, such as a student's tablet based on the first processing information. In this way, information interaction can be realized between the first device and the second device. The whole process not only integrates information processing, but is also convenient, and can achieve deeper linkage and interaction between the devices, thereby greatly improving the user experience.

In an embodiment, in the step S1, the first operation includes at least one of the following:

confirming at least one first data information;

accessing default applications and/or services;

operating preset function buttons, such as homework assignment buttons, in-class inspection buttons, screen sharing buttons, game function buttons, etc. In an embodiment, the preset function buttons can be virtual buttons and/or physical buttons, etc.;

detecting preset gestures and/or preset key operations; and detecting preset voice instruction.

In an embodiment, in the step S1, the first processing information includes at least one of the following:

document information or text information;

image information;

audio information or video information;

related information of at least one first user corresponding to the first device (such as image information, voice information, etc.).

In some embodiments, confirming at least one first data information includes receiving at least one preset voice instruction, capturing at least one image, receiving at least one connection request, receiving at least one multimedia file, selecting at least one multimedia file, and downloading at least one of at least one file. The multimedia file includes video and/or audio, and the at least one image captured may include at least one face image obtained by taking a photo or video recording, which may be monitored and determined through the control application of the device camera, or be monitored and determined through the file system.

Preset applications and/or services include but are not limited to game applications, smart teaching applications, video playback applications, cloud and/or locally provided services.

Preset function buttons include but are not limited to share button, play button, and start button.

Preset gestures and/or preset key operations include but are not limited to preset track sliding, double-click, single-click, long press, short press, heavy press, and light press;

Preset voice instructions are voice instructions received by the device, including but not limited to sharing instructions, playback instructions, and startup instructions.

In an embodiment, the device can output corresponding at least one first processing information based on the scenario and/or mode and/or user operation. For example, the first device detects the distribution of test papers in the multi-screen linkage teaching scenario and/or mode. Preset voice operation to output at least one first processing information, such as test paper document information or text information.

In an embodiment, the first device detects a key operation to start musical instrument teaching in a multi-screen linkage teaching scenario and/or mode, and outputs at least one first processing information, such as image information of the teacher's fingers.

In an embodiment, the first device detects that the hosting function is enabled under the game application and outputs at least one first processing information, such as the screen of the current game application.

In an embodiment, in the step S1, outputting at least one first processing information includes at least one of the following:

outputting the first processing information in the first device according to a first preset strategy;

outputting the first processing information according to a second preset strategy.

In an embodiment, the first preset strategy includes at least one of the following:

in response to that the first processing information is at least one of the document information, text information, picture information, and at least one first user information corresponding to the first device, the first device displays the first processing information; and in response to that the first processing information is at least one of audio information, video information, and animation information, the first device plays the first processing information.

In some embodiments, in response to the first device performing the first operation, determining the first processing information, and displaying or playing the first processing information in the first device, so that a user of the first device can intuitively obtain the specific content or form of the first processing information, which can be more easily compared with the subsequent second processing information, so that the user of the first device can clearly understand and distinguish the first processing information provided by the first device and the second processing information provided by the second device.

In an embodiment, the second preset strategy includes:

detecting whether the first device and/or the second device meet a first preset condition;

in response to the first device and/or the second device meeting a first preset condition, sending the first processing information directly; and/or, in response to the first device and/or the second device not meeting a first preset condition, performing corresponding processing on the first processing information, and then sending the processed first processing information.

In an embodiment, the first preset condition includes at least one of the following:

the first device and/or the second device being provided with a preset function or a preset service;

device parameters of the first device and/or the second device being greater than or equal to a device parameter threshold;

the first device and the second device being established a connection or being in a same communication network;

the first device and the second device being authenticated, or the first device and the second device being mutually authenticated; and the second device sending a processing information request to the first device, and the first device confirming sending the processing information.

In an embodiment, the corresponding processing of the first processing information includes at least one of the following:

compression, format conversion, encryption.

In an embodiment, after determining the first processing information, the first device sends the first processing information according to the second preset strategy. Before sending the first processing information, it is necessary to determine whether the first device and/or the second device meet the first preset condition.

For the preset condition that the first device and/or the second device have preset functions or services, for example, before sending the first processing information, the first device determines that the first device and/or the second devices are both installed with the same application program. In an embodiment, the application program is associated with the first processing information and/or the second processing information. In response to that the determining result is yes, it means that both the first device and/or the second device have the ability to process the first processing information and/or the second processing information. Therefore, the first device can send the determined first processing in formation to the second device directly; and/or, in response to that the determining result is no, and the second device does not have a preset application installed, the first device can process the first processing information into information that the second device can support or process. Then it is sent to the second device. For example, the first processing information is video, its format is converted into audio information and then sent to the second device.

For the preset condition that the device parameters of the first device and/or the second device are greater than or equal to the device parameter threshold, for example, the first device, before sending the first processing information, determines that whether the device parameters of the first device and/or the second device are greater than or equal to the device parameter threshold. In an embodiment, the device parameters include at least one of the remaining powers of the device, the remaining data of the device, the remaining storage space of the device, the signal strength of the device, the distance of the device, and the unoccupied rate of the CPU of the device. Taking the device distance as an example, when it is detected that the device distance between the first device and the second device is greater than or equal to the preset distance or exceeds the preset range, it indicates that the first device and the second device are not in the same environment. Therefore, the voice information of the first device is sent directly to the second device; and/or, in response to detecting that the device distance between the first device and the second device is less than the preset distance or does not exceed the preset range, indicating that the first device and the second device may both be in a conference, and the first device automatically converts the voice information into text or pictures before sending it to the second device.

For the first device and the second device that have established a connection or are in the same communication network, for example, before sending the first processing information, the first device determines whether the first device and the second device have established a connection or are on the same communication network. In response to that the determining result is yes, it indicates that the first device and the second device can communicate directly, so the first device directly sends the first processing information to the second device; and/or, in response to that the determining result is no, if the first device and the second device have not established a Bluetooth connection, it pauses sending the first processing information, and outputs prompt information to prompt the user of the first device to connect to the Bluetooth device.

For the first device and the second device that have mutually authenticated each other, for example, in order to protect user privacy or data security, the first device needs to determine whether the first device and the second device are authenticated before sending the first processing information. In response to that the determining result is yes, it indicates that the first device and the second device can communicate securely, so the first device directly sends the first processing information to the second device; and/or, in response to that the determining result is no, for example, it is authenticated by the first device that the second device has not been security authenticated, it pauses sending the first processing information, and output prompt information to inform the user of the first device that the second device is a non-security device.

For the second device sending a processing information request to the first device, and the first device confirming sending the processing information, for example, the first device first determines whether it has received the second processing information before sending the first processing information, and whether the first device has confirmed sending the processing information. In response to that the determining result is yes, the first device directly sends the first processing information to the second device; and/or, in response to that the determining result is no, for example, the first device does not receive the processing information request sent by the second device, it indicates that the second device may currently be inconvenient or unable to perform relevant data processing, and it will terminate sending the first processing information.

In an embodiment, before step S2, the method includes:
  determining at least one second device according to the first operation and/or the first processing information.

In some embodiments, the first device is connected to at least one device or is in the same connection network. When the first device performs a first operation and/or outputs at least a first processing information, the first device needs to determine the second device from at least one of the connected devices. At this time, the first device determines the second device according to the first operation and/or the matching relationship between the first processing information and other devices. For example, when the first operation is an operation of selecting a sending device, such as dragging a file displayed on the current interface of the first device to the icon position corresponding to the smart tablet, then the smart tablet is determined to be the second device. For another example, in a smart home environment, when the user points the first device (such as a mobile phone) to the smart speaker, the smart speaker is determined to be the second device. In addition, the first device may also determine the device based on the matching relationship between the specific content of the first processing information or the type of processing information and the second device. For example, when the first device completes the video editing operation to form a video, the smart TV is automatically determined to be the second device based on the matching relationship between the video file and the smart TV.

In an embodiment, in the step S2, the second processing information is obtained by at least one second device performing corresponding processing based on the first processing information, including at least one of the following:
  the second device outputs the first processing information, receives the second operation, and performs corresponding processing on the first processing information according to the second operation;
  the second device receives the first processing information and performs corresponding processing on the first processing information according to the first preset processing rule;
  in response to the control right of the preset function of transferring or copying of the first device, the second device performs corresponding processing on the first processing information based on the control right of the preset function.

In an embodiment, in the step S2, the second processing information is obtained by at least one second device performing corresponding processing based on the first processing information, including:
  the second device outputs the first processing information processed according to the first preset processing rule;
  after receiving the third operation, the second device outputs the second processing information.

In an embodiment, the second operation and/or the third operation include at least one of the following:
  editing operations or adding operations or deleting operations;
  selecting operation;
  sharing operation or sending operation or receiving operation or transmitting operation; and
  confirming operation.

In an embodiment, the first preset processing rule includes at least one of the following:
  outputting the received first processing information;
  processing the received first processing information before outputting it;
  opening or launching or resuming a preset application and/or service; and
  triggering a preset function.

In some embodiments, the second device may process the received first processing information according to the attributes of the second device and/or the location of the second device and/or the attributes of the second user and/or the status of the second user, which improves the flexibility of information processing, thereby further improving the user experience. Processing the received first processing information may include at least one of the following:

filtering processing, for example, filtering the first processing information according to the location of the second device and/or the attributes of the second user (such as age, gender, class, etc.) corresponding to the second device;

adjusting processing, for example, editing the first processing information according to the attributes of the second user corresponding to the second device, such as adjusting the format, font size, order, etc. of the document information;

delaying processing and/or transmitting processing, for example, displaying and/or sending within a preset time period according to the status of at least one second user corresponding to the second device (such as location, leave status, etc.) and/or pre-stored settings. Opening or starting or restoring a certain preset application and/or service according to the attributes of the first processing information and/or triggering a certain preset function to output the first processing information, etc.

In an embodiment, the second device can output corresponding at least one second processing information based on the scenario and/or mode and/or user operation. For example, when the second device receives the information for multi-screen linkage teaching scenario and/or mode. After editing the test paper document information or text information, outputting the second processing information, such as answer sheet information;

or the second device, in a multi-screen linkage teaching scenario and/or mode, outputs the second processing information, such as leave status information, according to the status of the second user corresponding to the second device, such as leave status;

or the second device, in a multi-screen linkage teaching scenario and/or mode, after receiving image information of the teacher playing the piano, outputs the second processing information, such as image information of the student playing the piano;

or, after detecting that the hosting function is turned on under the game application, the second device outputs at least one first processing information, such as the screen of the current game application, and then outputs second processing information, such as the identification of the target object in the screen of the current game application, and/or operating instructions;

or, the second device receives at least one first processing information in a navigation scenario, such as a navigation processing request, and outputs the first processing information after triggering the navigation function, such as the navigation processing request, after receiving a third operation such as confirming operation, outputs the second processing information, such as the navigation route.

In an embodiment, step S2 includes at least one of the following:

outputting the second processing information, receiving the fourth operation, and performing corresponding processing on the second processing information according to the fourth operation; and receiving the second processing information, and performing corresponding processing on the second processing information according to the second preset processing rule.

In an embodiment, step S2 includes:

outputting the second processing information, receiving the fourth operation, and performing corresponding processing on the second processing information according to the fourth operation; and processing the second processing information after corresponding processing is processed according to the second preset processing rule to obtain a feedback result.

In an embodiment, the fourth operation includes at least one of the following:

editing operations or adding operations or deleting operations;

selecting operation;

sharing operation or sending operation or receiving operation or transmitting operation; and confirming operation.

In an embodiment, the second preset processing rule includes at least one of the following:

outputting the received second processing information;

processing the received second processing information before outputting it;

opening or launching or resuming a preset application and/or service; and triggering a preset function.

In some embodiments, the first device may process the received second processing information according to the attributes of the first device and/or the location of the first device and/or the attributes of the first user and/or the status of the first user, and then output to improve the flexibility of information processing, thereby further improving the user experience. Processing the received second processing information includes at least one of the following:

filtering processing, for example, filtering the second processing information through recognition functions such as document recognition functions, image recognition functions, etc.;

adjusting processing, for example, editing the second processing information according to the attributes of the first user corresponding to at least one first device, such as adjusting the format, font size, order, etc. of the document information;

displaying and/or transmitting within a preset time period based on the status (such as location, leave status, etc.) and/or settings of at least one first user corresponding to the first device, opening or starting or restoring a certain preset application and/or service and/or triggering a certain preset function to output the second processing information according to the attributes of the second processing information, etc.

In an embodiment, the first device can obtain at least one feedback result based on the scenario and/or mode and/or user operation. For example, the first device receives the second processing information in a multi-screen linkage teaching scenario and/or mode, for example, the answer sheet information; receives the fourth operation, such as checking the operation and/or turning on the sorting function and then outputting the feedback result, such as scoring or ranking, etc.; or the first device receives the second processing information in the multi-screen linkage teaching scenario and/or mode, such as the image information of a student playing the piano; outputs feedback results after receiving the second processing information, such as image reception completion or reception incompletion information.

In an embodiment, after detecting that the hosting function is turned on under the game application, the first device receives the second processing information, such as the identification and/or operation instruction of the target object in the screen of the current game application, and operates the target object in response to the operation instruction; outputs feedback results, such as the updated screen of the current game application.

In an embodiment, the first device outputs the second processing information in a navigation scenario, such as a navigation route, and outputs a feedback result, such as a result of continuing navigation, according to the second preset processing rule, for example, when no change instruction is received within a preset time. Outputting the feedback result when the continue navigation instruction is not received within the preset time, for example, starting or pausing or resuming or suspending or terminating the transmission of information, etc.

FIG. 4 is a schematic diagram of scenarios and/or modes of the processing method according to the first embodiment. As shown in FIG. 4, which illustrates a scenario of information interaction between a first device 301 and at least one second device 302 (only two devices are shown in the figure, but are not limited to this). Taking a multi-screen linkage teaching scenario as an example, after accessing the teaching application, the first device 301 can interact with at least one second device 302 to achieve a better teaching experience. The first device 301 and the second device 302 may be connected through a network 303 in advance. The network 303 may include a short-distance transmission wireless network such as Bluetooth and WiFi, may also include a mobile operator's network, and may also include a cloud-based data transmission network, thereby enabling information interaction between the first device 301 and the second device 302 through the network 303.

Figure 5A:
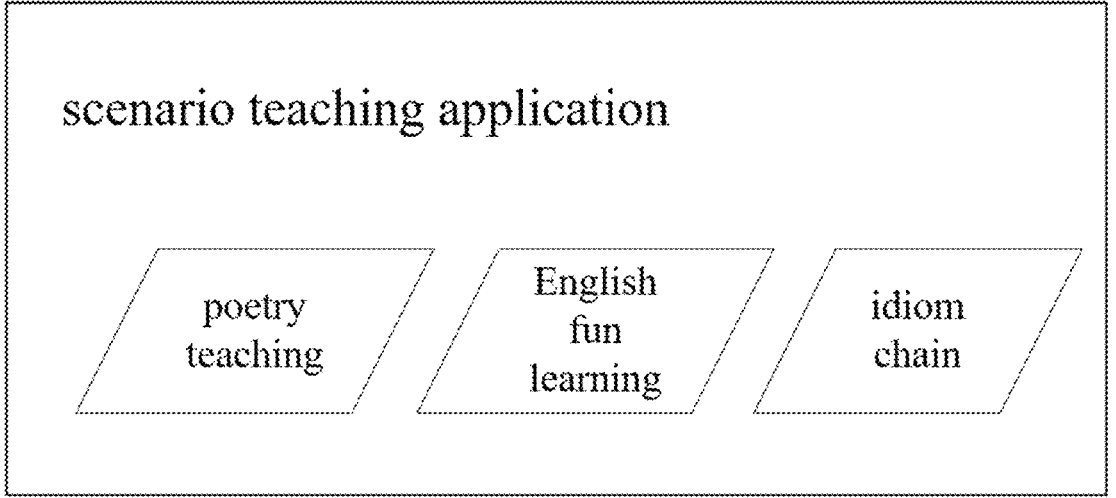
FIG. 5(*a*), FIG. 5(*b*), and FIG. 5(*c*) are respectively schematic interface diagrams of the processing device according to the first embodiment.
Figure 5B:
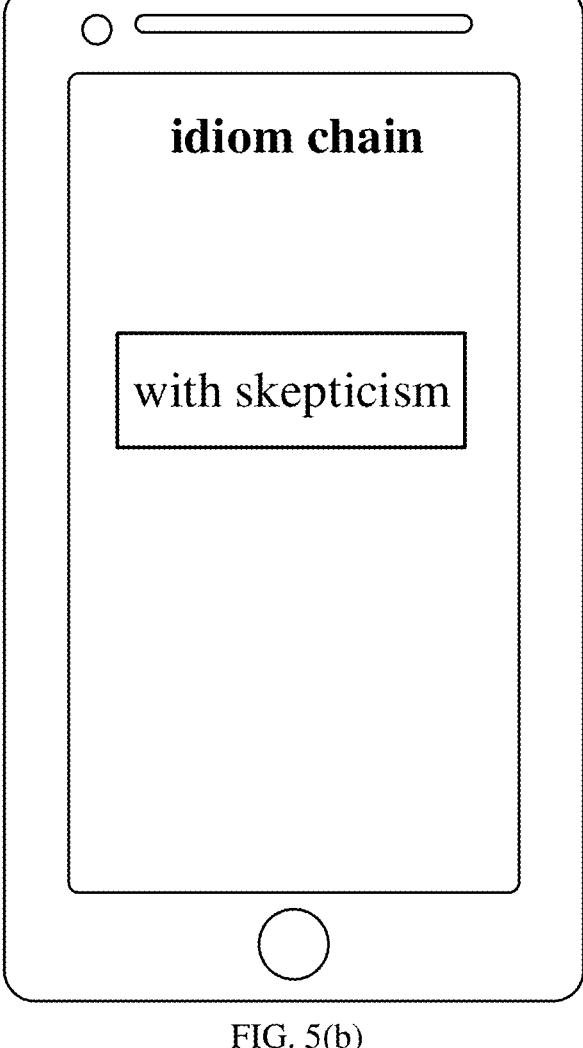
Figure 5C:
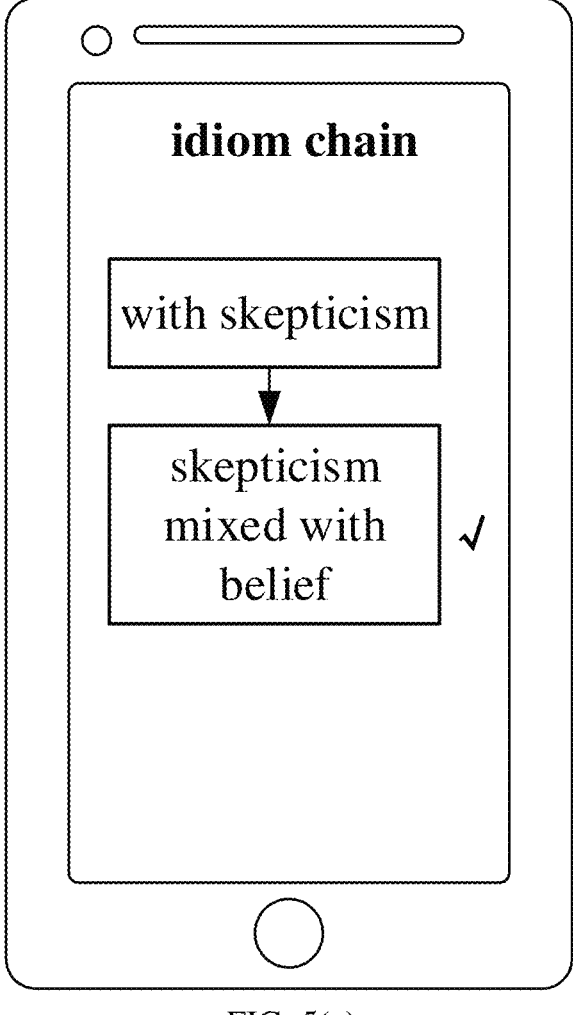

After accessing the teaching application, the first device 301 displays the interface shown in FIG. 5(a). In some embodiments, the first device 301 can share the screen data to at least one second device 302 for display, so that at least one second device 302 displays the interface as shown in FIG. 5(a). The first user corresponding to the first device 301 can click "Poetry Teaching" or "English Fun Learning" or "Idiom Chain" to choose to start one of the scenario teaching, then send the first processing information, such as the first processing content "with skepticism" to at least one second device 302 for display, so that the second device 302 displays the interface as shown in FIG. 5(b) and receives the second processing information output by the second device 302 corresponding to the target device identification, such as "skepticism mixed with belief", the feedback result is output to at least one second device 302, so that the at least one second device 302 displays the interface as shown in FIG. 5(c).

As described above, the processing method of the present application includes in response to the first device performing a first operation; outputting at least one first processing information; receiving and processing the second processing information to obtain at least one feedback result, the second processing information is obtained by at least one second device performing corresponding processing based on the first processing information; outputting the feedback result to the second device. The present application realizes information interaction between devices based on operations performed by processing devices. The entire process not only integrates the processing functions between devices, but is also convenient, achieving deeper linkage and interaction between devices, thereby greatly improving the user experience.

Second Embodiment

FIG. 6 is a schematic flowchart of the processing method according to a second embodiment. As shown in FIG. 6, the processing method of this embodiment is applied to the first device. The processing method includes the steps:

S10: in response to the first device performing a first operation, outputting at least one first processing information;

S20: transferring or copying control right of a preset function to at least one second device;

S30: receiving and processing second processing information, the second processing information is obtained by the at least one second device performing corresponding processing on the first processing information based on the control right of the preset function.

The first device and the second device can be terminal devices (such as mobile phones, Portable Android Device (PAD) (tablet computers, etc.), wearable smart devices (such as smart watches, smart bracelets, smart headphones, etc.), smart teaching equipment (such as smart blackboards), smart TVs, smart speakers, etc.), Internet of Vehicles devices (such as smart cars, vehicle-mounted terminals, etc.). Through the above method, the device can transfer or copy the control right of the preset functions to at least one second device when performing specified operations, and realize information interaction between devices. The entire process combines information processing with the transferring or copying of control rights, and is also convenient. The transferring and copying of control rights realize device linkage, expanding the linkage capabilities and interaction of devices. Thus, the user experience is greatly improved. For example, in a navigation scenario and/or mode, the first device responds to performing a first operation, such as a sending operation, and outputs at least one first processing information, such as navigation screen information. After the control right of the preset function, such as the navigation screen operation function, is transferred or copied to the second device, the second processing information is received and processed, such as the identification and/or operation instructions of the target object in the navigation screen information. In an embodiment, the second processing information is obtained by at least one second device performing corresponding processing through a preset function based on the first processing information. In this way, information interaction can be achieved between the first device and the second device, and the entire process combines information processing and the transferring or copying of the control right, which is also convenient. The transferring and copying of control rights realize device linkage, expand the linkage capability and interaction of the device, thereby greatly improving the user experience.

In an embodiment, in the step S10, the first operation includes at least one of the following:

confirming at least one first data information;

accessing preset applications and/or services;

operating preset function buttons, such as homework assignment buttons, in-class inspection buttons, screen sharing buttons, game function buttons, etc.;

detecting preset gestures and/or preset key operations; and detecting preset voice instruction.

In an embodiment, in the step S10, the first processing information includes at least one of the following:

document information or text information;

image information;

audio information or video information; and related information (such as image information) of at least one first user corresponding to the first device.

In some embodiments, confirming at least one first data information includes receiving at least one preset voice instruction, capturing at least one image, receiving at least one connection request, receiving at least one multimedia file, selecting at least one multimedia file, and downloading at least one of the file, the multimedia file includes video and/or audio, and the capturing at least one image may include obtaining at least one face image by taking a photo or video recording, which may be monitored and determined through the control application of the device camera, or be monitored and determined through the file system.

the preset applications and/or services include but are not limited to game applications, smart teaching applications, video playback applications, cloud and/or locally provided services;

the preset function buttons include but are not limited to, share buttons, play buttons, and start buttons; the preset gestures and/or preset button operations include but are not limited to, preset trajectory sliding, double-click, click, long press, short press, heavy press, light press;

the preset voice instructions are voice instructions received by the device, including but not limited to sharing instructions, playback instructions, and startup instructions.

In an embodiment, the device can output corresponding at least one first processing information based on the scenario and/or mode and/or user operation. For example, the first device detects the operation of the preset voice of distributing test papers in the multi-screen linkage teaching scenario and/or mode, then output at least one first processing information, such as test paper document information or text information.

In an embodiment, the first device detects a starting button operation of musical instrument teaching in a multi-screen linkage teaching scenario and/or mode, and outputs at least one first processing information, such as image information of the teacher's fingers.

In an embodiment, the first device detects that the hosting function is enabled in the game application and outputs at least one first processing information, such as the screen of the current game application.

In an embodiment, in order to avoid security risks caused by transferring or copying control rights, step S20: transferring or copying control right of a preset function to at least one second device, includes:

in response to the first device meeting a first control condition, and/or the preset function meeting a second control condition, and/or in response to the second device meeting the requirements, transferring or copying the control right of the preset function to at least one of the second devices.

In an embodiment, step S20 includes:

detecting whether the first device meeting the first control condition and/or whether the preset function meeting the second control condition;

in response to the first device meeting the first control condition, detecting whether there is a second device meeting the requirements among devices connected to the first device;

in response to the preset function meeting the second control condition, transferring or copying the control right of the preset function to at least one of the second devices.

In an embodiment, the first control condition includes at least one of the following:

accessing one preset application and/or service;

not accessing one certain preset application and/or service;

receiving confirmation information;

detecting preset identity information; and configuration value corresponding to the preset function being less than or equal to a threshold.

In an embodiment, the second control condition includes at least one of the following:

matching an application and/or service running on the first device;

matching the first processing information;

the authority level being less than or equal to the preset level;

matching the preset identity information.

In an embodiment, meeting the requirements includes at least one of the following:

the power being greater than or equal to a threshold;

the authority level being greater than or equal to a preset level;

the configuration corresponding to the preset function being greater than or equal to the threshold; and the environment information meeting a preset environment condition.

In some embodiments, in order to ensure security while improving operation convenience, the copying or transferring conditions of control rights of different preset functions are also different in the same scenario and/or mode, and/or the copying or transferring conditions of control rights of one same preset function are also different in the different scenario and/or mode. For example, when the first device accesses the teaching or game scenario and/or mode, the first device detects the preset identity information, such as the teacher's biometric information, and receives the message for the preset function, such as when receiving the confirmation information of the sending function of the data, transfers or copies the control rights of the preset function, such as the data sending function, to the second device. When receiving the confirmation information for the preset function, such as the screen editing function, the control rights of the screen editing function are transferred or copied to the second device.

In another embodiment, the first device accesses the payment scenario, when the first device detects preset identity information, such as biometric information of a user whose authority value is higher than the preset value, and when the first device is for the confirmation information of the preset function, copy or transfer the control rights of preset functions to the second device.

In this way, in different scenarios, different filtering and/or restrictions are performed on the use of preset functions, which is beneficial to improving the security during the information interaction process and improving the convenience of interaction.

In an embodiment, in order to avoid unnecessary transmission of data causing waste of resources, step S10 may be performed after performing step S20: transferring or copying control right of a preset function to at least one second device, and then performing step S10: in response to the first device performing a first operation, outputting at least one first processing information.

In an embodiment, in the step S30, the second processing information is obtained by the at least one second device performing corresponding processing on the first processing information based on the control right of the preset function, including:

the second device outputting the first processing information;

the second device performing corresponding processing on the first processing information according to the second operation, and/or performing corresponding processing on the first processing information according to the first preset processing rule;

the second device responding to the control right of the preset function transferred or copied by the first device, and performing corresponding processing on the first processing information based on the control right of the preset function.

In an embodiment, the second operation includes at least one of the following:

editing operations or adding operations or deleting operations;

selecting operation;

sharing operation or sending operation or receiving operation or transmitting operation; and confirming operation.

In an embodiment, the first preset processing rule includes at least one of the following:

outputting the received first processing information;

processing and outputting the received first processing information;

opening or starting or resuming a preset application and/or service; and triggering a preset function.

In some embodiments, the second device may process the received first processing information according to the attributes of the second device and/or the location of the second device and/or the attributes of the second user and/or the status of the second user, and then output to improve the flexibility of information processing, thereby further improving the user experience.

Processing the received first processing information includes at least one of the following:

filtering the first processing information according to the location of the second device and/or the attributes of the second user corresponding to the second device;

adjusting the first processing information according to the attributes of the second user corresponding to the second device, such as adjusting the format, font size, and order; and delaying and/or transmitting according to status of the second user and/or the attributes of the first processing information, for example, displaying or sending according to the status of at least one second user (such as location, and leave status) and/or in a preset time period, opening or starting or resuming one preset application and/or service and/or triggering one preset function for outputting to the first processing information, etc.

In an embodiment, the second device may output the at least one corresponding second processing information based on the scenario and/or mode and/or user operation. For example, the second device outputs at least one processing information such as test document information in a multi-screen linkage teaching scenario and/or mode. After receiving the editing information for the test paper document information input through the document editing function, the second processing information, such as the answer information, is output to the first device.

In an embodiment, after detecting the hosting function is turned on in the game application, the second device outputs at least one first processing information, such as the screen of the current game application, and then outputs the second processing information through a preset function such as a gravity sensing function or a touch function. The second processing information, for example, may be an identification and/or an operation instruction for a target object in the screen of the current game application, and the first device outputs the target object in response to the operation instruction.

In an embodiment, in the step S10, the outputting the at least one first processing information includes at least one of the following:

outputting the first processing information in the first device according to a first preset strategy; and sending the first processing information according to the second preset strategy.

In an embodiment, the first preset strategy includes at least one of the following:

in response to that the first processing information is at least one of the document information, text information, picture information, the related information of at least one first user corresponding to the first device, then the first device displays the first processing information;

in response to that the first processing information is at least one of audio information, video information, and animation information, the first device plays the first processing information.

In some embodiments, in response to the first device performing the first operation, the first processing information is determined, and the first processing information is displayed or played in the first device, so that a user of the first device can intuitively obtain the specific content or form of the first processing information, which can be more easily compared with the subsequent second processing information, so that the user of the first device can clearly understand and distinguish the first processing information provided by the first device and the second processing information provided by the second device.

In an embodiment, the second preset strategy includes:

detecting whether the first device and/or the second device meet a first preset condition;

in response to the first device and/or the second device meeting the first preset condition, sending the first processing information directly; and/or, in response to the first device and/or the second device not meeting the first preset condition, performing corresponding processing on the first processing information, and then sending the processed first processing information.

In an embodiment, the first preset condition includes at least one of the following:

the first device and/or the second device being provided with a preset function or a preset service;

device parameters of the first device and/or the second device being greater than or equal to a device parameter threshold;

the first device and the second device being established a connection or being in a same communication network;

the first device and the second device being authenticated, or the first device and the second device being mutually authenticated; and the second device sending a processing information request to the first device, and the first device confirming sending the processing information.

In an embodiment, the corresponding processing of the first processing information includes at least one of the following:

compression, format conversion, and encryption.

In some embodiments, after determining the first processing information, the first device sends the first processing information according to the second preset strategy. Before sending the first processing information, it is necessary to determine whether the first device and/or the second device meet the first preset condition.

For the preset condition that the first device and/or the second device being provided with the preset functions or services, for example, before sending the first processing information, the first device determines that the first device and/or the second devices are both installed with the same application program. In an embodiment, the application program is associated with the first processing information and/or the second processing information. If the determining result is yes, it means that both the first device and/or the second device are capable of processing the first processing information and/or the second processing information. Therefore, the first device can send the determined first processing information directly to the second device; and/or, if the determining result is no, for example, the second device does not have a preset application installed, the first device can process the first processing information into information that the second device can support or process, and then send the information to the second device. For example, when the first processing information is a video, the format of the first processing information is converted into audio information and then sent to the second device.

For the preset condition that the device parameters of the first device and/or the second device being greater than or equal to a device parameter threshold, for example, the first device, before sending the first processing information, determines that whether the device parameters of the first device and/or the second device are greater than or equal to the device parameter threshold. In an embodiment, the device parameters include at least one of the remaining powers of the device, the remaining data of the device, the remaining storage of the device, the signal strength of the device, the distance of the device, and the unoccupied rate of the CPU of the device. Taking the device distance as an example, when it is detected that the device distance between the first device and the second device is greater than or equal to the preset distance or exceeds the preset range, it indicates that the first device and the second device are not in the same environment. Therefore, the voice information of the first device is sent directly to the second device; and/or, when it is detected that the device distance between the first device and the second device is less than the preset distance or does not exceed the preset range, indicating that the first device and the second device may both be in a conference, and the first device automatically converts the voice information into text or pictures before sending it to the second device.

For the first device and the second device that have established a connection or are in the same communication network, for example, before sending the first processing information, the first device determines whether the first device and the second device have established the connection or are on the same communication network. If the determining result is yes, it indicates that the first device and the second device can communicate directly, so the first device directly sends the first processing information to the second device; and/or if the determining result is no, for example, the first device and the second device have not established a Bluetooth connection, then the sending the first processing information is paused, and the prompt information is output to prompt the user of the first device to connect to the Bluetooth device.

For the first device and the second device that have been mutually authenticated, for example, in order to protect user privacy or data security, the first device needs to determine whether the first device and the second device are authenticated before sending the first processing information. If the determining result is yes, it indicates that the first device and the second device can communicate securely, so the first device directly sends the first processing information to the second device; and/or, if the determining result is no, for example, it is authenticated by the first device that the second device has not been security authenticated, it will pause sending the first processing information, and output prompt information to inform the user of the first device that the second device is a non-security device.

For the second device sending a processing information request to the first device, and the first device confirms sending the processing information, for example, the first device first determines whether it has received the processing information request sent by the second device before sending the first processing information, and whether the first device has confirmed sending the processing information. If the determining result is yes, the first device directly sends the first processing information to the second device; and/or, if the determining result is no, for example, the first device does not receive the processing information request sent by the second device, it indicates that the second device may currently be inconvenient or unable to perform relevant data processing, and then it will terminate sending the first processing information.

In an embodiment, include before step S20:

determining at least one second device according to the first operation and/or the first processing information.

In some embodiments, the first device is connected to at least one device or is in the same connection network. When the first device performs a first operation and/or outputs at least a first processing information, the first device needs to determine the second device among at least one connected device. Then, the first device determines the second device according to the first operation and/or the matching relationship between the first processing information and other devices. For example, when the first operation is an operation of selecting a sending device, such as dragging a file displayed on the current interface of the first device to the icon position corresponding to the smart tablet, then the smart tablet is determined to be the second device. As another example in a smart home environment, when the user points the first device (such as a mobile phone) to the smart speaker, the smart speaker is determined to be the second device. In addition, the first device may also determine the device based on the matching relationship between the specific content of the first processing information or the type of processing information and the second device. For example, when the first device completes the video editing operation to form a video, the smart TV is automatically determined to be the second device based on the matching relationship between the video file and the smart TV.

As described above, in the processing method of the present application, in response to the first device performing the first operation; outputting at least one first processing information; transferring or copying the control right of the preset function to at least one second device, and receiving and processing the second processing information. The second processing information is obtained by at least one second device performing corresponding processing on the first processing information based on the control right of the preset function. The present application realizes information interaction between devices and transfer or copy of control rights of preset functions based on operations performed by processing devices. The entire process not only integrates the processing functions between devices and realizes information interaction between devices, but is also convenient.

The transferring and copying of control rights realize device linkage, expand the linkage capabilities and interaction of devices, thus greatly improving the user experience.

Third Embodiment

FIG. 7 is a schematic flowchart of the processing method according to a third embodiment. As shown in FIG. 7, the processing method of the embodiment is applied to the first device. The processing method includes the steps:

S100: in response to the first device performing a first operation, transferring or copying the control right of the preset function to at least one second device; and S200: receiving and processing a processing information sent by at least one second device, the processing information being obtained by at least one second device performing corresponding processing based on control right of the preset function.

The first device and the second device can be terminal devices (such as mobile phones, Portable Android Device (PAD) (tablet computers, etc.), wearable smart devices (such as smart watches, smart bracelets, smart headphones, etc.), smart teaching equipment (such as smart blackboards, smart TVs, smart speakers, etc.), Internet of Vehicles devices (such as smart cars, vehicle-mounted terminals, etc.). Through the above method, the control rights between devices can be copied or transferred, realizing device linkage, weakening the function of the device itself, and expanding application capabilities of the device, thereby greatly improving the user experience. For example, in a game scenario and/or mode, the first device responds to performing a first operation, such as a confirmation operation, and transfers or copies the control right of the preset function, such as a navigation function to the second device, such as a mobile terminal associated with the first device, it receives second processing information, such as turning on the navigation function and/or navigation voice instructions, and performs corresponding processing according to the second processing information, such as turning on the navigation function, and/or outputting the navigation route according to the navigation voice instructions. In an embodiment, the second processing information is obtained by at least one second device performing corresponding processing based on the preset function and the first processing information. In this way, the control rights can be copied or transferred between the first device and the second device, realizing device linkage, weakening the function of the device itself, expanding the application capabilities of the device, thereby greatly improving the user experience.

In an embodiment, the first operation includes at least one of the following:

confirming at least one first data information;

accessing the preset applications and/or services;

operating the preset function buttons;

detecting the preset gestures and/or preset key operations; and detecting the preset voice instruction.

In some embodiments, confirming at least one first data information includes receiving at least one preset voice instruction, capturing at least one image, receiving at least one connection request, receiving at least one multimedia file, selecting at least one multimedia file, and downloading at least one of the files. The multimedia file includes video and/or audio, and the capturing at least one image may include at least one face image obtained by taking a photo or video recording, which may be monitored and determined through the control application of the device camera or the file system.

The preset applications and/or services include but are not limited to game applications, smart teaching applications, video playback applications, cloud and/or locally provided services.

The preset function buttons include but are not limited to share button, play button, and start button.

The preset gestures and/or preset key operations include but are not limited to preset track sliding, double-click, click, long press, short press, heavy press, and light press; the preset voice instructions are voice instructions received by the device, including but not limited to share instructions, play instructions, and start instructions.

In an embodiment, step S100: in response to the first device performing a first operation, transferring or copying the control right of the preset function to at least one second device includes:

in response to the first device performing a first operation, determining the control right to be transferred or copied of at least one preset function based on the key information.

In an embodiment, the key information includes at least one of the following:

device function requirement information;

identity information; and right information.

For example, the first device may determine the control right of at least one preset function to be transferred or copied through the device function requirement information.

For example, after the first device accesses the game application, it can determine that the function requirement information is acceleration sensing, touch control, gravity sensing, etc., thereby determining that the control rights of at least one of the acceleration control function, touch control function, and gravity control function are the control rights of the preset function to be transferred or copied.

For another example, after the first device accesses the teaching application, it can determine that the function requirement information is touch control, video playback, document format conversion, etc., thereby determining that the control rights of at least one of touch display, video playback, and document format conversion are the control rights of the preset function to be transferred or copied.

For another example, when the first device accesses the navigation application, it can determine that the function requirement information is the voice recognition function, touch control, etc., thereby determining that the control rights of the voice recognition function and touch control function are the control rights of the preset function to be transferred or copied.

In some embodiments, the determining at least one preset function to be transferred or copied based on key information, includes at least one of the following:

determining at least one target function according to at least one of the device function information, determining whether the at least one target function meets the transferring or copying condition according to the right information, and determining the control right of the preset function to be translated or copied from the at least one target function based on a determining result;

determining at least one function requirement according to the identity information, and determining the control right of at least one preset function to be transferred or copied according to the at least one function requirement.

For example, the user's identity information is obtained through image collection and/or fingerprint collection, and then the user's right information is determined based on the identity information.

In a scenario, when a user opens a game application, it can be determined that the target function may include the gravity operation function and the audio playback function. However, since it is recognized that he is not a designated user, his right information only allows the transfer or copy of the control right of the audio control function, thereby preventing certain functions from being abused.

In a scenario, when user A enters the vehicle, he or she can determine the function requirement information to be using the navigation application and using the speaker based on the preference data and/or usage habits corresponding to the identity information of user A. When user B enters the vehicle, he or she can determine the function requirement information to be using navigation applications and using Bluetooth headsets according to the preference data and/or usage habits corresponding to the identity information of user B, thereby determining the control rights of functions that need to be transferred or copied, so that the user can transfer or copy the control rights of the preset functions more conveniently. In this way, filtering and/or restricting the usage of the transferred or copied control rights through identity information and right information is conducive to improving security, privacy and convenience in the resource sharing process.

In an embodiment, in the step S200, the processing information being obtained by at least one second device performing corresponding processing based on control right of the preset function, includes:

the second device outputting the first processing information;

the second device performing corresponding processing on the first processing information according to the second operation, and/or performing corresponding processing on the first processing information according to the first preset processing rule; and the second device responds to the first device transferring or copying the control right of the preset function and outputting processing information after receiving the third operation based on the control right of the preset function.

In an embodiment, the second operation and/or the third operation include at least one of the following:

editing operations or adding operations or deleting operations;

selecting operation;

sharing operation or sending operation or receiving operation or transmitting operation; and confirming operation.

In an embodiment, the first preset processing rule includes at least one of the following:

outputting the received first processing information;

processing and outputting the received first processing information;

opening or starting or resuming a preset application and/or service; and triggering a preset function.

In some embodiments, the second device may process the received first processing information according to the attributes of the second device and/or the location of the second device and/or the attributes of the second user and/or the status of the second user, which improves the flexibility of information processing, thereby further improving the user experience.

The processing the received first processing information may include at least one of the following:

filtering processing, for example, filtering the first processing information according to the location of the second device and/or the attributes of the second user (such as age, gender, class, etc.) corresponding to the second device;

adjusting processing, for example, editing the first processing information according to the attributes of the second user corresponding to the second device, such as adjusting the format, font size, order, etc. of the document information;

delaying processing and/or transmitting processing, for example, displaying and/or sending within a preset time period according to the status of at least one second user corresponding to the second device (such as location, leave status, etc.) and/or pre-stored settings. Opening or starting or restoring a certain preset application and/or service according to the attributes of the first processing information and/or triggering a certain preset function to output the first processing information, etc.

In an embodiment, the second device can output corresponding at least one processing information based on the scenario and/or mode and/or user operation. For example, when the second device outputs the at least one first processing information for multi-screen linkage teaching scenario and/or mode, such as test document information. After receiving the editing information for the test paper document information input through the document editing function, the processing information is output. For example, when the answer information is sent to the first device, the first device outputs the processing information such as the answer information.

In an embodiment, after detecting that the hosting function is turned on in the game application, the second device outputs at least one first processing information, such as the screen of the current game application, and then outputs the processing information through a preset function such as a gravity sensing function or a touch function. The processing information may be, for example, an identification and/or an operation instruction for a target object in the screen of the current game application, and the first device outputs the target object in response to the operation instruction.

In an embodiment, step S100 further includes:

determining at least one of the second devices according to the first operation.

In some embodiments, the first device is connected to at least one device or in the same connection network. When the first device performs the first operation, the first device needs to determine the second device from the at least one connected device. Then, the first device determines the second device based on the matching relationship between the first operation and other devices. For example, when the first operation is an operation of selecting a sending device, such as dragging a file displayed on the current interface of the first device to the icon position corresponding to the smart tablet, then the smart tablet is determined to be the second device. For another example, in a smart home environment, when the user points the first device (such as a mobile phone) to the smart speaker, the smart speaker is determined to be the second device.

In an embodiment, step S200 includes:

outputting the processing information, receiving the fourth operation, and performing corresponding processing on the processing information according to the fourth operation;

processing the processed information after corresponding processing according to the second preset processing rule to obtain feedback results.

In an embodiment, the fourth operation includes at least one of the following:

editing operations or adding operations or deleting operations;

selecting operation;

sharing operation or sending operation or receiving operation or transmitting operation; and confirming operation.

In an embodiment, the second preset processing rule includes at least one of the following:

outputting the received processing information;

processing and outputting the received first processing information;

opening or starting or resuming a preset application and/or service; and triggering a preset function.

In an embodiment, after step S200, the method further includes:

S300: outputting the feedback result to the second device.

In an embodiment, in the step S300, the feedback result includes at least one of the following:

information after editing the processing information;

information being started or paused or resumed or suspended or terminated to transmit; and information being received or unreceived.

In some embodiments, the first device may process the received processing information according to the attributes of the first device and/or the location of the first device and/or the attributes of the first user and/or the status of the first user and then output the process information to improve the flexibility of information processing, thereby further improving user experience.

The processing the received processing information includes at least one of the following:

filtering processing, for example, filtering the processing information through recognition functions such as document recognition functions, image recognition functions, etc.;

adjusting processing, for example, editing the processing information according to the attributes of the first user corresponding to at least one first device, such as adjusting the document information format, font size, order, etc.;

delaying processing and/or transmitting processing, for example, displaying and/or sending according to the status of at least one second user corresponding to the first device (such as location, leave status, etc.) and/or being provided in the preset time period. Opening or starting or restoring a certain preset application and/or service according to the attributes of the processing information and/or triggering a certain preset function to output the processing information, etc.

In an embodiment, the first device can obtain at least one feedback result based on the scenario and/or mode and/or user operation. For example, the first device receives processing information, such as answer sheet information, in a multi-screen linkage teaching scenario and/or mode, receiving the fourth operation, such as checking operation and/or turning on the sorting function, and outputting feedback results, such as scoring or ranking, etc.

In an embodiment, the first device receives processing information in a multi-screen linkage teaching scenario and/or mode, such as image information of a student playing the piano, and outputs a feedback result after receiving the processing information, such as the information of the image reception completion or incomplete reception.

In an embodiment, after detecting that the hosting function is turned on under the game application, the first device receives the processing information, such as the identification and/or operation instructions of the target object in the current game application screen, operates the target object in response to the operation instructions, and outputs the feedback results, such as the updated screen of the current game application.

In an embodiment, the first device outputs processing information in a navigation scenario, and outputs a feedback result according to the second preset processing rule. For example, the first device outputs a navigation route in the navigation scenario, when no change instruction is received within a preset time, the result of continuing navigation is output, when the continuing navigation instruction is not received within the preset time, the information of starting or pausing or resuming or suspending or terminating the transmission, etc. are output.

As described above, in the processing method of the present application, in response to in response to the first device performing a first operation, transferring or copying the control right of the preset function to at least one second device; receiving and processing a processing information sent by at least one second device, the processing information is obtained by at least one second device performing corresponding processing based on control right of the preset function. The present application can realize the transferring or copying of control rights between devices, expand the application capabilities of the devices, and greatly improves the user experience through linkage between devices.

The present application further provides a processing device, including a memory and a processor, a processing program is stored on the memory, and when the processing program is executed by the processor, steps of the processing method according to any one of the above embodiments are implemented.

The present application further provides a computer-readable storage medium. A computer program is stored on the readable storage medium, and when the computer program is executed by a processor, steps of the processing method according to any one of the above embodiments are implemented.

The embodiments of processing device and computer-readable storage media provided by the present application include all technical features of each embodiment of the above method. The expansion and explanation content of the description is basically the same as that of each embodiment of the above method, and details are not repeated here.

The embodiments of the present application further provide a computer program product including computer program code. When the computer program code is run on a computer, the computer is made to execute the methods described in the various possible implementation manners above.

The embodiments of the present application further provide a chip including a memory and a processor. The memory is configured to store a computer program, and the processor is configured to call and run the computer program from the memory, so that the device installed with the chip executes the methods described in the various possible implementation manners above.

It is understood that the above-mentioned scenarios are only examples and do not constitute a limitation on the application scenarios of the technical solutions provided by the embodiments of the present application. The technical solutions of the present application can also be applied to other scenarios. For example, those of ordinary skill in the art know that with the evolution of system architecture and the emergence of new business scenarios, the technical solutions provided in the embodiments of the present application are also applicable to similar technical problems.

The above serial numbers of the embodiments of the present application are only for description and do not represent the advantages or disadvantages of the embodiments.

The steps in the methods according to the embodiments of the present application can be sequence adjusted, combined, and deleted according to actual needs.

The unit in the device according to the embodiments of the present application can be merged, divided, and deleted according to actual needs.

In the present application, the same or similar terms, concepts, technical solutions and/or application scenario descriptions are generally only described in detail the first time they appear. When they appear again, for the sake of simplicity, they are generally not described again. When understanding the technical solutions and other content of the present application, for the same or similar term concepts, technical solutions and/or application scenario descriptions that are not described in detail later, refer to the relevant previous detailed descriptions.

In the present application, the descriptions of each embodiment have their own emphases, and for parts that are not detailed or recorded in a certain embodiment, refer to the relevant descriptions of other embodiments.

The technical features of the present application can be combined in any way. To simplify the description, not all possible combinations of the technical features in the above embodiments are described. However, as long as there is no contradiction in the combination of these technical features, they should be considered to be within the scope of the present application.

Through the description of the above embodiments, those skilled in the art can clearly understand that the methods of the above embodiments can be implemented by means of software plus a necessary general-purpose hardware platform, and of course also by hardware, but in many cases the former is better implementation. Based on this understanding, the essence of the technical solution of the present application or the part that contributes to the prior art can be embodied in the form of software products, the computer software product is stored in one of the above storage media (such as ROM/RAM, magnetic disk, optical disk), including several instructions to make a terminal device (which may be a mobile phone, a computer, a server, a controlled terminal, or a network device, etc.) execute the method of each embodiment of the present application.

In the above embodiments, it may be implemented in whole or in part by software, hardware, firmware, or any combination thereof. When implemented using software, it may be implemented in whole or in part in the form of a computer program product. A computer program product includes one or more computer instructions. When computer program instructions are loaded and executed on a computer, processes or functions according to embodiments of the present application are generated in whole or in part. The computer may be a general purpose computer, a special purpose computer, a computer network, or other programmable device. Computer instructions may be stored in or transmitted from one computer-readable storage medium to another computer-readable storage medium, e.g., computer instructions may be transmitted from a website, computer, server or data center via a wired link (e.g. coaxial cable, optical fiber, digital subscriber line) or wireless (such as infrared, wireless, microwave, etc.) means to transmit to another website site, computer, server or data center. Computer-readable storage medium can be any available medium that can be accessed by a computer or a data storage device such as a server, data center, or other integrated medium that contains one or more available medium. Available medium may be magnetic medium (e.g., floppy disk, storage disk, magnetic tape), optical medium (e.g., DVD), or semiconductor medium (e.g., Solid State Disk (SSD)), etc.

The above are only some embodiments of the present application, and are not therefore limiting the scope of the present application. Any equivalent structure or equivalent process transformation made by using the contents of the specification and drawings of the present application, or directly or indirectly used in other related technical fields, is also included in the scope of the present application.

What is claimed is:

1. A processing method, applied to a first device, comprising following steps:

in response to the first device performing a first operation, outputting at least one first processing information;

transferring or copying a control right of a preset function of the first device to at least one second device; and receiving and processing second processing information, wherein the second processing information is obtained by the at least one second device performing corresponding processing on the first processing information based on the control right of the preset function of the first device;

wherein the second processing information being obtained by the at least one second device performing corresponding processing on the first processing information based on the control right of the preset function of the first device comprises:

the at least one second device outputting the first processing information;

the at least one second device performing corresponding processing on the first processing information according to a second operation, and/or performing corresponding processing on the first processing information according to a first preset processing rule;

the at least one second device responding to the control right of the preset function transferred or copied by the first device, and performing corresponding processing on the first processing information based on the control right of the preset function of the first device;

wherein the first preset processing rule comprises at least one of the following:

outputting the received first processing information;

processing and outputting the received first processing information;

opening or launching or resuming a preset application and/or service; and triggering a preset function.

2. The processing method according to claim 1, wherein the outputting the at least one first processing information comprises:

detecting whether the first device and/or the at least one second device meet a first preset condition; and in response to the first device and/or the at least one second device not meeting the first preset condition, performing corresponding processing on the first processing information, and then sending processed first processing information;

wherein, the first preset condition comprises at least one of the following:

the first device and/or the at least one second device being provided with the preset function or a preset service;

device parameters of the first device and/or the at least one second device being greater than or equal to a device parameter threshold;

the first device and the at least one second device being established a connection or being in a same communication network;

the first device and the at least one second device being authenticated, or the first device and the at least one second device being mutually authenticated; and the at least one second device sending a processing information request to the first device, and the first device confirming sending the processing information.

3. The processing method according to claim 1, wherein the transferring or copying the control right of the preset function of the first device to at least one second device comprises:

in response to the first device meeting a first control condition and/or the preset function meeting a second control condition, and/or in response to the at least one second device meeting requirements, transferring or copying the control right of the preset function of the first device to the at least one second device.

4. The processing method according to claim 3, wherein:

the first control condition comprises at least one of the following:

accessing one preset application and/or service;

not accessing one certain preset application and/or service;

detecting preset identity information; a configuration value corresponding to the preset function being less than or equal to a threshold; and/or, the second control condition comprises at least one of the following:

matching an application and/or service running on the first device;

matching the first processing information;

an authority level being less than or equal to a preset level;

matching preset identity information; and/or, the meeting the requirements comprises at least one of the following:

a power being greater than or equal to a threshold;

an authority level being greater than or equal to a preset level;

a configuration corresponding to the preset function being greater than or equal to the threshold; and environment information meeting a preset environment condition.

5. The processing method according to claim 3, wherein the transferring or copying the control right of the preset function of the first device to at least one second device comprises:

detecting whether the first device meeting the first control condition and/or whether the preset function meeting the second control condition;

in response to the first device meeting the first control condition, detecting whether there is a second device meeting the requirements among devices connected to the first device;

in response to the preset function meeting the second control condition, transferring or copying the control right of the preset function of the first device to the at least one second device.

6. The processing method according to claim 1, wherein before the transferring or copying the control right of the preset function of the first device to at least one second device, the processing method further comprises at least one of the following:

determining the at least one second device according to the first operation and/or the first processing information; and determining the at least one second device according to specific content of the first processing information or a matching relationship between a processing information type of the first processing information and the at least one second device.

7. The processing method according to claim 1, wherein copying or transferring conditions of the control rights of different preset functions are different in a same scenario and/or mode; and/or the copying or transferring conditions of the control rights of a same preset function are different in the same scenario and/or mode.

8. The processing method according to claim 1, wherein the second processing information is obtained by the at least one second device performing corresponding processing on the first processing information based on the control right of the preset function of the first device, further comprises: first processing information received by the at least one second device is output after being processed.

9. The processing method according to claim 8, wherein the first processing information received by the at least one second device is output after being processed comprises:

the received first processing information is output after being processed according to attributes of the at least one second device and/or a location of the at least one second device and/or attributes of a second user and/or status of the second user.

10. The processing method according to claim 9, wherein the at least one second device processing the received first processing information comprises at least one of the following:

filtering the first processing information according to the location of the at least one second device and/or the attributes of the second user corresponding to the at least one second device;

adjusting the first processing information according to the attributes of the second user corresponding to the at least one second device; and delaying and/or transmitting according to status of the second user and/or the attributes of the first processing information corresponding to the at least one second device.

11. A processing method, applied to a first device, comprising following steps:

in response to the first device performing a first operation, transferring or copying a control right of a preset function of the first device to at least one second device; and receiving and processing a processing information sent by the at least one second device, the processing information being obtained by the at least one second device performing corresponding processing based on the control right of the preset function of the first device;

wherein the processing information being obtained by the at least one second device performing corresponding processing based on the control right of the preset function of the first device comprises:

the at least one second device outputting a first processing information;

the at least one second device performing corresponding processing on the first processing information according to a second operation, and/or performing corresponding processing on the first processing information according to a first preset processing rule; and the at least one second device responding to the first device transferring or copying the control right of the preset function of the first device, and the at least one second device outputting processing information after receiving a third operation based on the control right of the preset function of the first device;

wherein the first preset processing rule comprises at least one of the following:

outputting the received first processing information;

processing and outputting the received first processing information;

opening or launching or resuming a preset application and/or service; and triggering a preset function.

12. The processing method according to claim 11, wherein the in response to the first device performing the first operation, transferring or copying the control right of the preset function of the first device to at least one second device comprises:

in response to the first device performing the first operation, detecting whether the first device meeting a first control condition and/or whether the preset function meeting a second control condition;

in response to the first device meeting the first control condition, detecting whether there is a second device meeting requirements among devices connected to the first device; and in response to the preset function meeting the second control condition, transferring or copying the control right of the preset function of the first device to the at least one second device.

13. The processing method according to claim 11, wherein the transferring or copying the control right of the preset function of the first device to the at least one second device comprises:

in response to the first device performing the first operation, determining at least one preset function to be transferred or copied based on key information; the key information comprises at least one of the following:

device function requirement information;

identity information; and right information.

14. The processing method according to claim 13, wherein the determining at least one preset function to be transferred or copied based on key information comprises at least one of the following:

determining at least one target function according to at least one of the device function requirement information, and determining whether the at least one target function meets a transferring or copying condition according to the right information, and determining the control right of the preset function to be translated or copied from the at least one target function based on a determining result;

determining at least one function requirement according to the identity information, and determining the control right of the at least one preset function to be transferred or copied according to the at least one function requirement.

15. The processing method according to claim 11, further comprising:

outputting a feedback result to the at least one second device, the feedback result being obtained based on processing the processing information, wherein the feedback result comprises at least one of the following:

information after editing the processing information;

information being started or paused or resumed or suspended or terminated to transmit; and information being received or unreceived.

16. A processing method, applied to a first device, comprising following steps:

in response to the first device performing a first operation, outputting at least one first processing information;

receiving and processing second processing information to obtain at least one feedback result of the first device, wherein the at least one feedback result of the first device is obtained based on the first device processing the second processing information, and the second processing information is obtained by the at least one second device performing corresponding processing based on the first processing information; and outputting the at least one feedback result of the first device to the at least one second device;

wherein the second processing information being obtained by the at least one second device performing corresponding processing based on the first processing information comprises at least one of the following:

the at least one second device outputting the first processing information, receiving a second operation, and performing corresponding processing on the first processing information according to the second operation;

the at least one second device receiving the first processing information and performing corresponding processing on the first processing information according to a first preset processing rule;

the at least one second device performing corresponding processing on the first processing information based on a control right of the preset function transferred or copied by the first device;

wherein the first preset processing rule comprises at least one of the following:

outputting the received first processing information;

processing and outputting the received first processing information;

opening or launching or resuming a preset application and/or service; and triggering a preset function.

17. The processing method according to claim 16, wherein after the at least one second device receiving the first processing information and performing corresponding processing on the first processing information according to the first preset processing rule, the method further comprises:

outputting, by the at least one second device, the first processing information processed according to the first preset processing rule; and after receiving a third operation, outputting, by the at least one second device, the second processing information.

18. The processing method according to claim 16, wherein the at least one second device processing the received first processing information comprises at least one of the following:

filtering the first processing information according to the location of the at least one second device and/or the attributes of the second user corresponding to the at least one second device;

adjusting the first processing information according to the attributes of the second user; and delaying and/or transmitting according to status of the second user and/or the attributes of the first processing information.

* * * * *